US009833840B2

(12) United States Patent
Ruud

(10) Patent No.: US 9,833,840 B2
(45) Date of Patent: Dec. 5, 2017

(54) APPARATUS AND METHOD FOR MANUFACTURING PARTICLES

(71) Applicant: REACTIVE METAL PARTICLES AS, Haslum (NO)

(72) Inventor: Eirik Ruud, Oslo (NO)

(73) Assignee: REACTIVE METAL PARTICLES AS, Haslum (NO)

( * ) Notice: Subject to any disclaimer, the term of this patent is extended or adjusted under 35 U.S.C. 154(b) by 358 days.

(21) Appl. No.: 14/396,518

(22) PCT Filed: Apr. 26, 2013

(86) PCT No.: PCT/IB2013/053304
§ 371 (c)(1),
(2) Date: Oct. 23, 2014

(87) PCT Pub. No.: WO2013/160874
PCT Pub. Date: Oct. 31, 2013

(65) Prior Publication Data
US 2015/0047467 A1  Feb. 19, 2015

(30) Foreign Application Priority Data
Apr. 27, 2012  (NO) .................................. 20120493

(51) Int. Cl.
*B22F 9/12* (2006.01)
*B22F 9/28* (2006.01)
(Continued)

(52) U.S. Cl.
CPC .................. *B22F 9/12* (2013.01); *B01J 4/002* (2013.01); *B01J 12/02* (2013.01); *B01J 19/123* (2013.01);
(Continued)

(58) Field of Classification Search
None
See application file for complete search history.

(56) References Cited

U.S. PATENT DOCUMENTS 4,594,101 A  6/1986 Miura et al.
4,991,541 A  2/1991 Sugata et al.
(Continued)

FOREIGN PATENT DOCUMENTS

CN  1406693  4/2003
CN  1422195  6/2003
(Continued)

OTHER PUBLICATIONS

Office Action dated Aug. 17, 2015 in corresponding Chinese patent application No. 2013800223906.
(Continued)

*Primary Examiner* — George Wyszomierski
(74) *Attorney, Agent, or Firm* — Wenderoth, Lind & Ponack, L.L.P.

(57) ABSTRACT

An apparatus and method for manufacturing solid particles based on inert gas evaporation. The method includes forming a continuous gaseous feed flow, and injecting the continuous gaseous feed flow through an inlet into a free-space region of a reactor chamber in the form of a feed jet flow, and forming at least one continuous jet flow of a cooling fluid and injecting the at least one jet flow of cooling fluid into the reaction chamber. The feed jet flow is made by passing the feed flow at a pressure above the reactor chamber pressure in the range from $0.01 \cdot 10^5$ to $20 \cdot 10^5$ Pa through an injection nozzle. The jet flow of cooling fluid is made by passing the cooling fluid through an injection nozzle which directs the jet flow of cooling fluid such that it intersects the feed jet flow with an intersection angle between 30 and 150°.

26 Claims, 12 Drawing Sheets

(51) Int. Cl.
| | |
|---|---|
| B01J 12/02 | (2006.01) |
| B22F 9/30 | (2006.01) |
| C01B 13/20 | (2006.01) |
| B01J 19/26 | (2006.01) |
| B01J 4/00 | (2006.01) |
| C01B 21/06 | (2006.01) |
| C01G 9/03 | (2006.01) |
| B01J 19/12 | (2006.01) |
| C22C 18/00 | (2006.01) |
| B22F 1/00 | (2006.01) |

(52) U.S. Cl.
CPC ............... *B01J 19/26* (2013.01); *B22F 9/28* (2013.01); *B22F 9/30* (2013.01); *C01B 13/20* (2013.01); *C01B 21/06* (2013.01); *C01G 9/03* (2013.01); *C22C 18/00* (2013.01); *B01J 2219/0013* (2013.01); *B01J 2219/00123* (2013.01); *B01J 2219/00128* (2013.01); *B01J 2219/00137* (2013.01); *B01J 2219/00139* (2013.01); *B01J 2219/00141* (2013.01); *B01J 2219/029* (2013.01); *B01J 2219/0286* (2013.01); *B22F 1/0011* (2013.01); *B22F 1/0018* (2013.01); *B22F 2201/02* (2013.01); *B22F 2304/05* (2013.01); *B22F 2304/10* (2013.01); *B22F 2998/10* (2013.01); *C01P 2004/04* (2013.01)

(56) References Cited

U.S. PATENT DOCUMENTS

| | | | |
|---|---|---|---|
| 5,665,277 | A | 9/1997 | Johnson et al. |
| 7,214,446 | B1 | 5/2007 | Bi et al. |
| 2004/0013602 | A1 | 1/2004 | Taube |
| 2005/0042152 | A1* | 2/2005 | Gardner ............... B01J 19/121 422/186.3 |
| 2006/0147369 | A1* | 7/2006 | Bi ......................... B01J 4/002 423/594.17 |
| 2006/0165898 | A1 | 7/2006 | Kodas et al. |
| 2007/0084308 | A1* | 4/2007 | Nakamura ............... B22F 9/14 75/346 |
| 2007/0101823 | A1 | 5/2007 | Sen et al. |
| 2007/0221635 | A1 | 9/2007 | Boulos et al. |
| 2007/0262482 | A1 | 11/2007 | Halpap et al. |
| 2009/0020411 | A1* | 1/2009 | Holunga ............... B01J 19/121 204/157.41 |

FOREIGN PATENT DOCUMENTS

| | | |
|---|---|---|
| CN | 1474231 | 2/2004 |
| EP | 0 128 360 | 12/1984 |
| EP | 0 261 973 | 3/1988 |
| EP | 1 357 423 | 10/2003 |
| EP | 1 604 947 | 12/2005 |
| RU | 2 080 213 | 5/1997 |
| RU | 2 208 500 | 7/2003 |
| WO | 01/58625 | 8/2001 |
| WO | 03/062146 | 7/2003 |
| WO | 2007/103256 | 9/2007 |

OTHER PUBLICATIONS

International Search Report dated Nov. 14, 2013 in International Application No. PCT/IB2013/053304.
Norwegian Search Report dated Oct. 26, 2012 in corresponding Norwegian patent application No. 20120493.
International Preliminary Report on Patentability dated Jul. 16, 2014 in International Application No. PCT/IB2013/053304.
Written Opinion of the International Searching Authority dated Nov. 14, 2013 in International Application No. PCT/IB2013/053304.
Swihart M T: "Vapor-phase synthesis of nanoparticles", Current Opinion in Colloid and Interface Science, London, GB, vol. 8, No. 1, Mar. 1, 2003, pp. 127-133, XP008133465.
Kruis et al., "Synthesis of nanoparticles in the gas phase for functional applications", Oct. 22, 2001, XP055087135, Duisburg, Retrieved from the Internet: URL:http://duepublico.uni-duisburg-essen.de/servlets/DerivateServlet/Derivate-5148/index.html.
Kruis et al., "A review of synthesis of nanoparticles in the gas phase for electronic", Synthesis of nanoparticles in the gas phase for functional applications, Habilitation Thesis, Oct. 22, 2001, pp. 19-28, XP055087131, Duisberg, Retrieved from the Internet: URL:http://duepublico.uni-duisburg-essen.de/servlets/DerivateServlet/Derivate-5148/03Kap3.pdf.
Office Action dated Jan. 24, 2017 in corresponding Russian Application No. 2014146262, with English translation.

\* cited by examiner

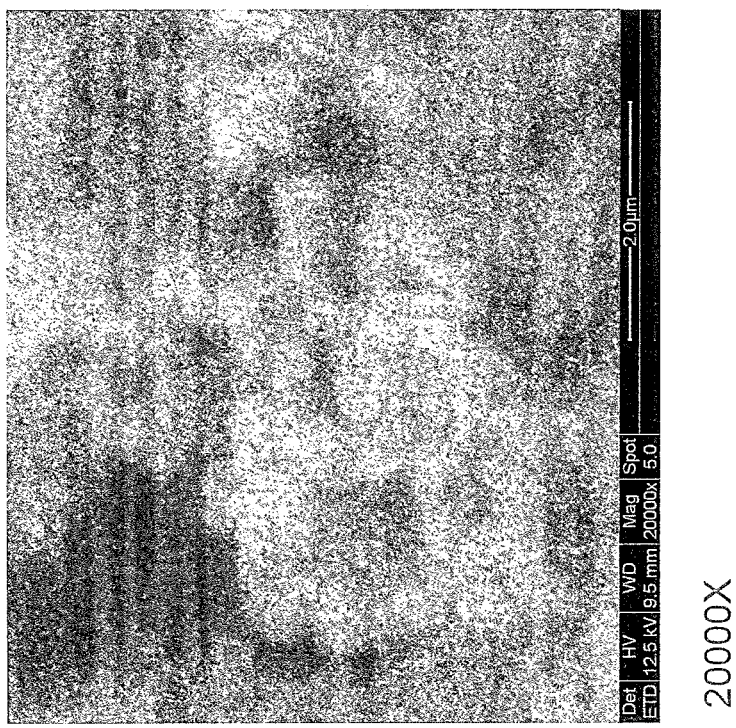
Figure 8 a) Test nr 1

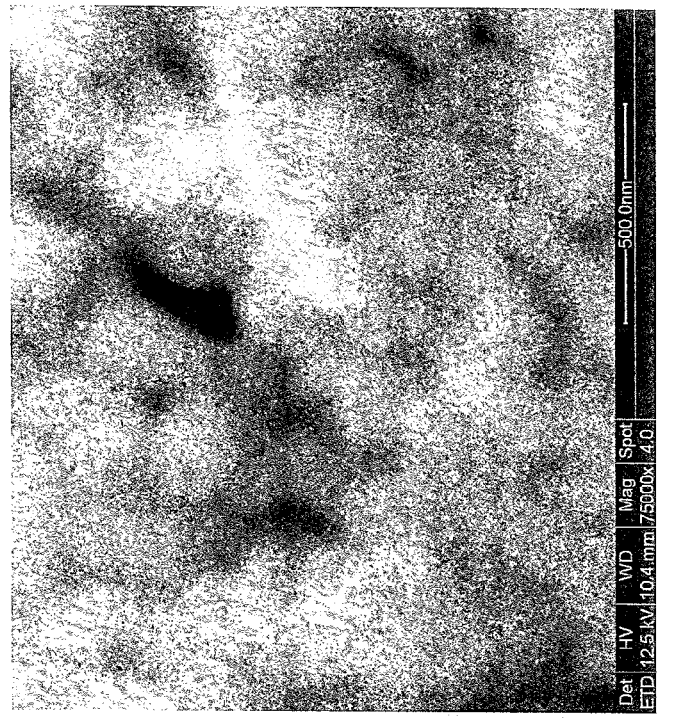
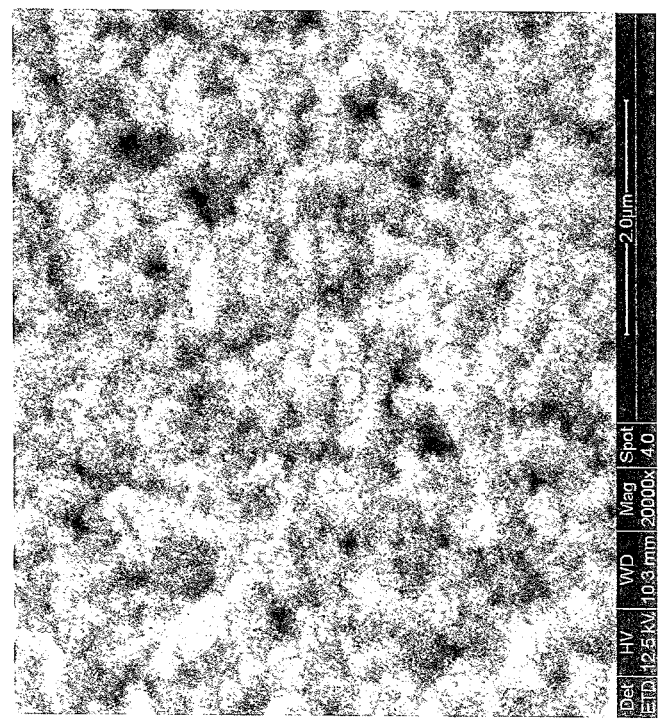
Figure 8 b) Test nr 2

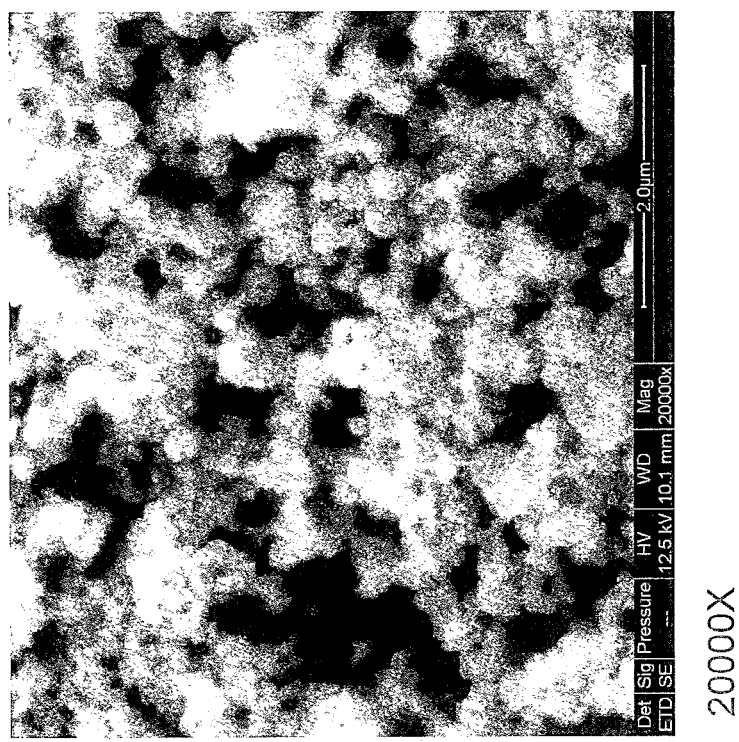
Figure 8 c) Test nr 3

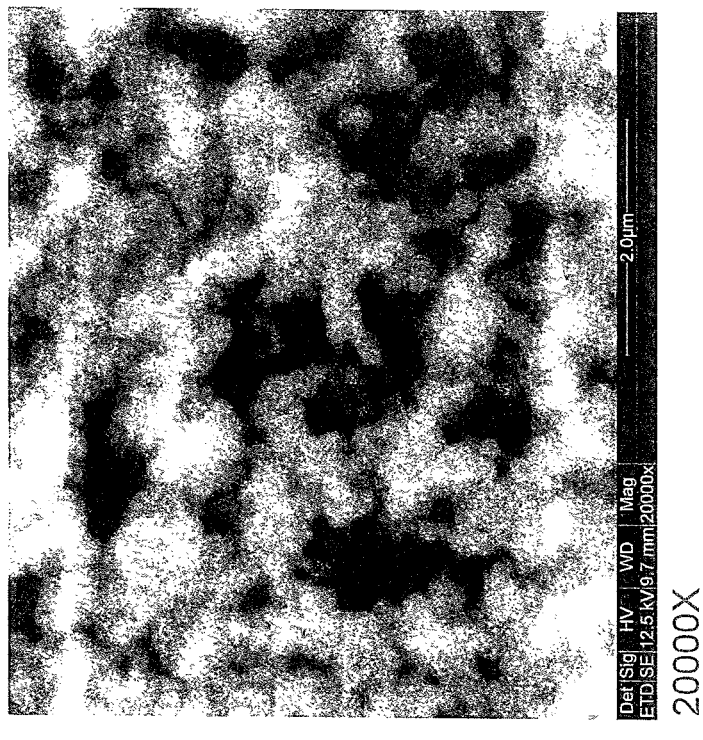
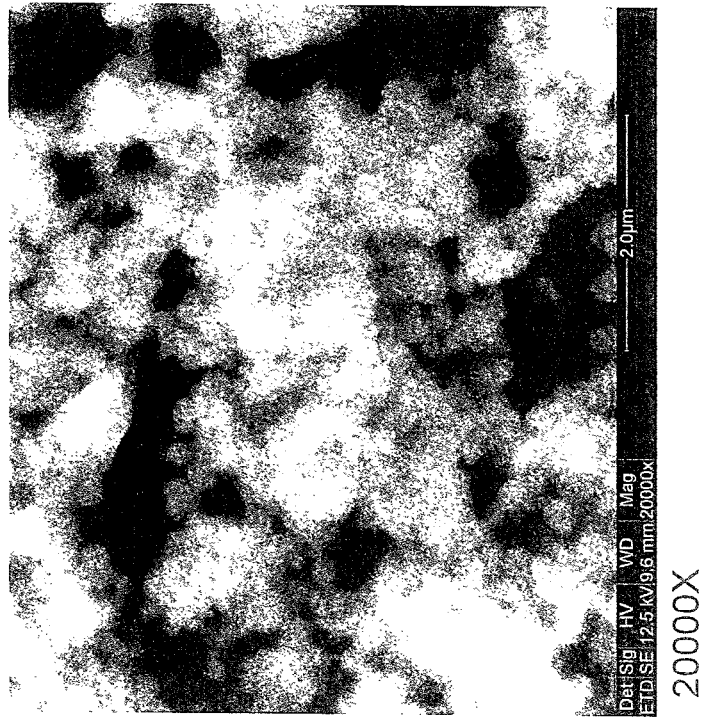
Figure 8 d) Test nr 4

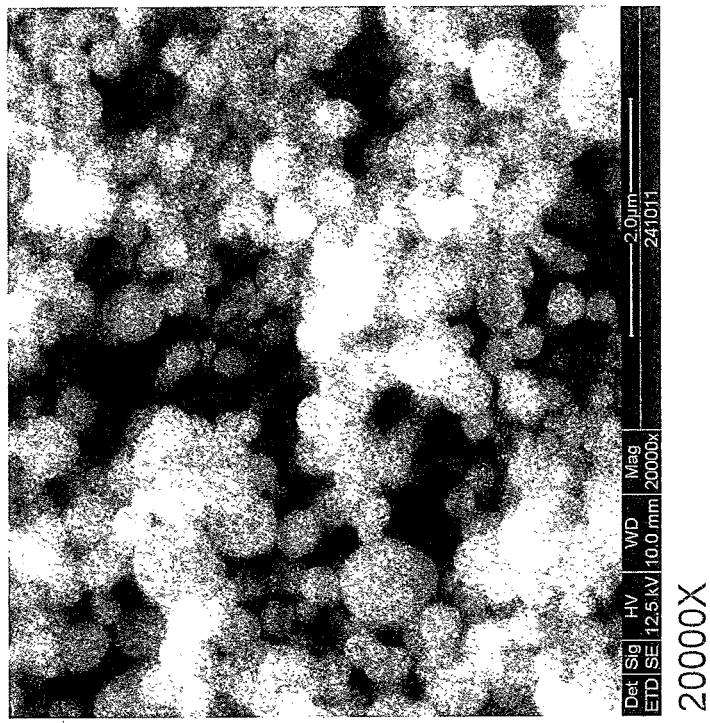
Figure 8 f) Test nr 6
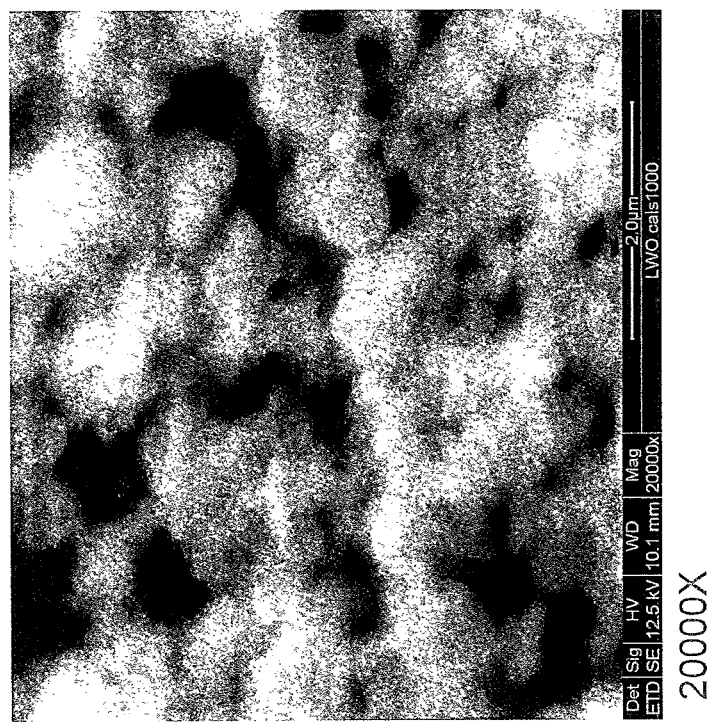
Figure 8 e) Test nr 5

APPARATUS AND METHOD FOR MANUFACTURING PARTICLES

The present invention relates to an apparatus and method for manufacturing micro, sub-micro and/or nanosized particles based on inert gas evaporation.

BACKGROUND

There is presently a strong interest for particles with dimensions in the order of a micrometer or less due to their high surface areas and correspondingly high chemical activities making them suitable for a range of applications. For example, metal submicron or nanosized particles have found many applications in i.e. biomedical, optical and electronic fields. Although particles of such size have existed previously, nanoparticles have received intensive research effort in recent years on account of unusual phenomena, for example quantum-effect phenomena, which nanoparticles are susceptible to exhibit.

The synthesis methods for submicron or nanoparticles may be divided into three main groups: The first group is based on the liquid-phase and involves chemical reactions in solvents to manufacture the particles, usually as colloids. The second group is based on surface growth of the particles under vacuum conditions by atomising a feed material and having the atoms diffusing towards a deposition surface. The third group is based on gas-phase synthesis and is the subject of the present patent application.

PRIOR ART

There are several known methods of manufacturing submicron- and nanosized particles based upon a first step of converting a metallic solid into its corresponding vapour phase, followed by a subsequent second step of controlled condensation of the vapour phase to form numerous small nanoparticles and/or submicron particles. These methods are mutually distinguished by different approaches to implementing their first and second steps. The first step can, for example, be implemented by thermal evaporation, inductively coupled plasma discharge, arc discharge and electro-explosion. The second step may, for example, be implemented by way of inert gas condensations.

Other examples of manufacturing nanoparticles at atmospheric pressure employ inductively-coupled plasma discharge and electro-explosion, for example in a manner as described in WO 01/58625A1, US2007/0221635, US2007/0101823 and in U.S. Pat. No. 5,665,277. The sudden temperature drop is contemporarily achieved in several manners:

(i) by superheating the vapour locally in a cooled environment, whereafter the vapour formed expands outwardly into its surrounding cooled environment to be thereby quenched;

(ii) a flow of cooling fluidis introduced into the region whereat the vapour is locally superheated, wherein the flow of gas carries some of the vapour with it, and nucleation to form nanoparticles occurs in the cooling gas;

(iii) the superheated vapour, most commonly in the form of a plasma torch, is directed into a quenching chamber or zone at a lower relative temperature in comparison to the temperature of the superheated vapour; and (iv) by adiabatic expansion of the vapour.

From WO 03/062146 it is known a method for the continuous production of nanotubes comprising forming a plasma jet, introducing into the plasma jet a metal catalyst or metal catalyst precursor to produce vaporised catalyst metal, directing one or more streams of quenching gas into the plasma to quench the plasma and passing the resulting gaseous mixture through a furnace, one or more nanotube forming materials being added whereby nanotubes are formed therefrom under the influence of the metal catalyst and are grown to a desired length during passage through the furnace, and collecting the nanotubes so formed. A method is described for the continuous production of nanotubes comprising forming a plasma jet, introducing into the plasma jet a metal catalyst or metal catalyst precursor to produce vaporised catalyst metal, directing one or more streams of quenching gas into the plasma to quench the plasma and passing the resulting gaseous mixture through a furnace, one or more nanotube forming materials being added whereby nanotubes are formed therefrom under the influence of the metal catalyst and are grown to a desired length during passage through the furnace, and collecting the nanotubes so formed.

Aforementioned known methods of manufacturing nanoparticles often employ material vapours in a temperature range of 5000 to 10000 K; heating materials to such high temperatures is very energy intensive. Moreover, use of such high temperatures has an undesirable drawback that any contaminants that are present in raw material employed will be transferred over to corresponding manufactured nanoparticles. In other words, high purity raw materials are needed for producing high purity nanoparticles. Moreover, quenching of superheated vapour occurs over a static volume or area, such that concentration gradients and/or temperature gradients, for example between a chamber wall and a centre of a region encircles by the walls, changes of turbulence and flow patterns of the cooling fluid and vapour within the chamber. Such gradients result in different nucleation conditions which tend to cause a broader spectrum of particle sizes and characteristics.

An article by Swihart (2003) [1] provides a review of vapour-phase synthesis methods. The article teaches that one common feature of these methods is to create conditions where a vapour phase of the material that is to form the particles is made thermodynamically unstable relative to formation of the solid phase. The article informs that the perhaps most straightforward method of achieving supersaturation is the inert gas condensation method where a solid is heated until evaporation and mixing the evaporated solid with a background/carrier gas, and then mix the background/carrier gas with a cold gas to reduce the temperature. By forming a sufficient degree of supersaturation and the right reaction kinetics, the article teaches that it is possible to obtain a homogeneous nucleation of the particles with dimensions down to nano-sizes. Smaller particles are favoured by conditions of high supersaturation followed by immediate quenching of the gas phase, either by removing the source of supersaturation or slowing the kinetics so that the particles stop growing. The article informs that these processes often happen rapidly, in a matter of milliseconds and often at a relatively uncontrolled fashion.

From WO 2007/103256 it is known a method and apparatus for generating nanoparticles at high concentration based upon solid aerosol dispersion in communication with a furnace tube having a vaporization chamber and a dilution chamber. A heating element surrounds the furnace tube. Heat from the heating element heats bulk material contained within a gas flow in the vaporisation chamber to a temperature sufficient to convert the bulk material to a vapour phase. Vaporised bulk materials are then moved to a dilution chamber, where an inert gas is introduced through a dilution gas port. The flow of the inert gas into the dilution chamber through the dilution gas port is sufficient to eject the bulk material from the exit of the dilution chamber, thereby condensing the bulk material into nano-sized particles in a gas flow of sufficient volume to prevent agglomeration of the nano-sized particles.

From a review article by Kruis et al. (1998) [2] it is known that oven sources are the simplest systems for provision of saturated vapour of substances having a large vapour pressure at intermediate temperatures (up to about 1700° C.), and that such systems may be combined with free expansion cooling of the saturated vapour to form a condensable gas. The article informs that converging nozzles which create adiabatic expansion in a low-pressure flow have enabled forming nanoparticles, but that the usual evaporation-condensation process gives a relatively wide particle size distribution. However, special designed nozzles have been shown to minimise boundary layer effects and thus approaching a one-dimensional temperature gradient in the flow direction which leads to a highly uniform quench rate forming nanoparticles with a narrow size distribution. The article does not provide information on the actual design of these nozzles.

US 2006/0165898 discloses a process for decreasing flame temperature in a flame spray reaction system, where the process comprises the steps of providing a precursor medium comprising a precursor to a component; flame spraying the precursor medium under conditions effective to form a population of product particles; and decreasing the flame temperature by contacting the flame with a cooling medium. The process of the present invention allows for the control of the size, composition and morphology of the nanoparticles made using the process. The invention also relates to a nozzle assembly that comprises a substantially longitudinally extending atomizing feed nozzle that comprises an atomizing medium conduit and one or more substantially longitudinally extending precursor medium feed conduits. The nozzle assembly of the present invention is used in a flame spray system to produce nanoparticles using the processes described herein.

From US 2004/0013602 it is known an apparatus for producing nano-particles according to the present invention may comprise a furnace defining a vapour region therein. A precipitation conduit having an inlet end and an outlet end is positioned with respect to the furnace so that the inlet end is open to the vapour region. A quench fluid supply apparatus supplies quench fluid in a gas state and quench fluid in a liquid state. A quench fluid port positioned within the precipitation conduit is fluidically connected to the quench fluid supply apparatus so that an inlet to the quench fluid port receives quench fluid in the gas state and quench fluid in the liquid state. The quench fluid port provides a quench fluid stream to the precipitation conduit to precipitate nano-particles within the precipitation conduit. A product collection apparatus connected to the outlet end of the precipitation conduit collects the nano-particles produced within the precipitation conduit.

As given above, it is important to have an excellent control with the gradients (temperature, pressure, and mass) in the precipitation region when producing particles by gas-phase condensation. The smaller particle diameter being produced, the more vital the control with the gradients becomes. However, the need of strict control with the gradient has hitherto been difficult to combine with the desire for up-scaling production lines to obtain an "economy of scale" effect, for the production of very small particles such as sub-micron and nanoparticles, since larger flow volumes means larger dimensions of the reactor and thus reduced control with the gradients in the reaction zone.

OBJECTIVE OF THE INVENTION

The objective of the present invention is to provide a method and apparatus for manufacturing solid particles in a manner which is scalable, reproducible and economical at high production rates.

It is further an objective of the invention to provide a method and apparatus for manufacturing solid particles with external diameters in the micron-, submicron- or nanoscale in a manner which is scalable, reproducible and economical at high production rates.

DESCRIPTION OF THE INVENTION

The present invention is a utilisation of the realisation that the very strict control of the gradients of mass, temperature and pressure required for manufacturing small, such as i.e. nanosized, particles with narrow size distributions by condensation from a gas phase, may be obtained for large volume flows by keeping the necessary small size in one characteristic dimension of the reaction zone and obtain the flow volume increase by expanding in another characteristic dimension. That, is by employing a specific nozzle design, it becomes possible to substantially increase the production volumes by increasing the volume flow and still maintain the required gradients of mass, temperature and pressure in the precipitation zone required to form i.e. nanosized, or larger, particles.

Thus in a first aspect, the present invention relates to a method for manufacturing solid particles of a material, where the method comprises:

forming a continuous gaseous feed flow comprising a saturated vapour of the material, and injecting the continuous gaseous feed flow through an inlet into a free-space region of a reactor chamber in the form of a feed jet flow protruding from the inlet, and forming at least one continuous jet flow of a cooling fluid and injecting the at least one jet flow of cooling fluid into the reaction chamber, wherein the feed jet flow is made by passing the feed flow at a pressure in the range from $0.01 \cdot 10^5$ to $20 \cdot 10^5$ Pa above the reactor chamber pressure through an injection nozzle functioning as the reactor inlet and which has a rectangular cross-sectional area of the nozzle opening with height $A_{feed}$ and width $B_{feed}$, where the aspect ratio $B_{feed}/A_{feed}$ is ≥2:1, and the height $A_{feed}$ is in the range from 0.1 to 40 mm, and each of the at least one jet flow of cooling fluid is made by passing the cooling fluid through an injection nozzle which directs the jet flow of cooling fluid such that it intersects the feed jet flow with an intersection angle between 30 and 150°, and where each of the at least one jet flow of cooling fluid, either individually or combined, mixes with substantially all of the gas of the feed jet flow at an intended distance apart from the nozzle opening for injection of the feed jet flow.

In a second aspect, the present invention relates to an apparatus for manufacturing solid particles of a material, where the apparatus comprises:

a feed-system for provision of a continuous gaseous feed flow comprising a saturated vapour of the material and where the feed flow is pressurised to a pressure in the range from $0.01 \cdot 10^5$ to $20 \cdot 10^5$ Pa above the reactor chamber pressure, a system for provision of at least one continuous supply flow of a cooling fluid, a reactor having a free-space chamber, an outlet for gas and a particle collector for capturing and extracting the manufactured solid particles, an injection nozzle in fluid connection with the continuous gaseous feed flow and which is located such that it injects the feed flow in the form of a feed jet flow protruding from the injection opening of the nozzle into the free-space region of the reaction chamber, and at least one cooling fluid injection nozzle in fluid connection with the continuous supply and which inject(s) at least one jet flow of cooling fluid into the reaction chamber, wherein the injection nozzle opening for injection of the feed jet flow has a rectangular cross-sectional area with height $A_{feed}$ and width $B_{feed}$, where the aspect ratio $B_{feed}/A_{feed}$ is $\geq$ to 2:1 and the height $A_{feed}$ is in the range from 0.1 to 40 mm, and the at least one injection nozzle for injecting the at least one jet flow of cooling fluid has a nozzle opening forming a jet flow of the cooling fluid and which is located such that the at least one jet flow of cooling fluid intersects the feed jet flow at an intersection angle between 30 and 150°, and which, either individually or combined, mixes with substantially all of the gas of the feed jet flow at an intended distance apart from the nozzle opening for injection of the feed jet flow.

The term "injection nozzle for injection of the feed jet flow" as used herein means any known or conceivable nozzle having a nozzle opening with a rectangular cross-section as shown schematically in FIGS. 1a) and 1b). In FIG. 1a) the injection nozzle is seen directly opposite the opening 111 of the nozzle flow channel. The height of the opening is indicated by arrows $A_{feed}$ and the width is indicated by arrows $B_{feed}$. In FIG. 1b) the same nozzle is shown from the side. The example embodiment shown in FIG. 1 has a convergent flow channel 112. However, this is only an example of a possible configuration of the injection nozzle and should thus not be interpreted as a limitation of the present invention. The invention is not tied to any specific design of the injection nozzle except for the rectangular opening with height $A_{feed}$ and width $B_{feed}$, where the aspect ratio is in one of the ranges specified above, apart from this restriction, any known or conceivable design of the feed jet injection nozzle may be applied. In FIG. 1, the gas flowing in the flow channel 112 is not shown for clarity. When exiting the opening 111, the feed gas will form a jet flow 101 which has a flow velocity vector 106, an upper major surface 103 and a lower major surface 104.

The feature of narrowing the height, $A_{feed}$, of the injection nozzle of the feed flow provides the effect of having a narrow spatial extension of the precipitation zone in one characteristic dimension, and thus obtaining the required control of the mass, temperature and pressure gradients. Thus the invention may be applied to form solid particles with external diameters ranging form about 5 μm or lower, down to about 1 nm. That is, the invention may form micron-, submicron-, and/or nanoscaled particles of practically any solid material which may be condensed from its gaseous phase. As used herein, the term "submicron particles" are defined as being particles whose external diameter is in a range of about 100 to 1000 nm, and the term "nanoparticles" are defined as being particles whose external diameter is about 100 nm or less. The invention may be applied for forming solid particles with an external diameter in on of the following ranges; from 1 nm to 5 μm, from 5 to 100 nm, from 100 to 1000 nm, or from 1 to 2 μm.

The feature of expanding the width, $B_{feed}$, of the injection nozzle of the feed flow without increasing the dimensions and related gradients for the height, $A_{feed}$, provides the ability of increasing the flow volumes and thus production rates without loosing control of the temperature gradients necessary to form such small particles. In principle, there is no upper limit of the width that may be applied by the invention since the control of the gradients is obtained by the restriction on the height, $A_{feed}$. Thus any conceivable length of the width, $B_{feed}$ may be applied by the invention. In practice, it may be advantageous to apply an injection nozzle for the feed flow having an aspect ratio, $B_{feed}/A_{feed}$, in one of the following ranges; from 10 000:1 to 2:1; from 2500:1 to 5:1; from 1000:1 to 5:1; from 750:1 to 5:1; from 400:1 to 10:1; from 200:1 to 10:1; or from 100:1 to 2:1. The height $A_{feed}$ of the rectangular cross-section of the opening may be in one of the following ranges; from 0.1 to 40 mm, from 0.15 to 35 mm, from 0.2 to 30 mm, from 0.25 to 25 mm, from 0.3 to 20 mm, from 0.4 to 15 mm, from 0.4 to 10 mm, from 0.5 to 10 mm, from 0.5 to 5 mm, from 0.75 to 5 mm, from 0.75 to 2.5 mm, from 1 to 2.5 mm, from 1 to 2 mm, from 0.1 to 2 mm, or 0.1 to 1 mm.

As used herein, the term "saturated vapour" is the partial pressure of the vaporised material in the gas stream (the vaporised material may or may not be mixed with an inert carrier gas) constituting the supply of material to the precipitation zone (usually in a reactor space) when the partial pressure of the vaporised material is in thermodynamic equilibrium with the condensed phases of the material at the given temperature and pressure in the system for continuous supply of vaporised material (to the reactor space). That is, the gas phase constituting the supply of vaporised material contains as much vaporised material as possible without condensation of the gaseous material at the actual temperature and pressure. Consequently, the term "supersaturated vapour" as used herein, means the condition where the partial pressure of the vaporised material is above the saturation pressure such that the thermodynamically stable condition involves condensation of the vaporised material in the gas phase. That is, depending on i.e. the precipitation reaction kinetics, there may be formed precipitation seeds in the gas phase containing supersaturated vapour of the material.

The feed gas may consist of more than one vapour material. It is envisioned forming a feed gas by mixing two or more gases of vaporised materials upstream of the injection nozzle forming the feed jet flow, i.e. by employing two or more evaporation chambers, or other vapour sources, each forming a flow of evaporated material and then joining the gaseous flows into one gas flow which is fed to the injection nozzle. The different gases may be mutually inert, for instance two or more metal vapours which will form alloyed metal particles, or the gases may be reactive forming a chemical compound in the gas phase which is subsequently condensed to a solid particle.

It is advantageous to employ small volumes of the quenching zone in order to obtain more uniform temperature gradient and thus uniform quench rates to obtain control with the size distribution of the particles being formed. Thus, ideally, the feed jet flow inside the reactor chamber should be spatially contained in the sense that the cross-sectional area of the flow normal to the flow direction does not expand or alter its shape along the flow path of the jet flow inside the reactor chamber. That is, the jet flow should ideally form an almost perfectly rectangular parallelepiped shaped jet flow protruding into the free-space of the reactor chamber. However, due to the pressure of the gas in the feed jet flow, the gas of the feed jet flow will inevitably begin to expand when entering the free-space of the reactor chamber, and thus make the feed jet flow to form a funnel resembling shape which protrudes into the reactor chamber as shown schematically in FIG. 2. The figure shows a typical spatial extension of the jet flow 101 after exiting the opening of the injection nozzle (not shown) having a rectangular cross-section area of height $A_{feed}$ and width $B_{feed}$ in relation to a rectangular coordinate system. The gas is flowing in the x-direction such that the flow 101 will have a symmetry plane 102 in the xy-plane and one major surface 103, 104 on each side of the symmetry plane 102 but with a small inclination angle such that the cross-sectional area of an intersecting yz-plane will be increasing in the x-direction. As used herein, the term "cross-sectional area" is in a plane oriented normal to the flow velocity vector of the jet flow unless specified otherwise, which in the example shown in FIG. 2 is a plane parallel to the yz-plane. The velocity vector lies along the symmetry axis of the symmetry plane in the direction of the flow.

The expansion of the feed jet flow is unfortunate since it spatially disperses the saturated vapour and induces an adiabatic temperature decrease of the jet flow which supersaturates the vapour and makes it harder to obtain the necessary control with the precipitation kinetics and uniformity of the temperature gradient and concentration gradient to form particles with the intended particles sizes and narrow size distribution. One solution of the problem with expansion of the feed jet stream is to locate the at least one jet flow of cooling fluid such that the cooling fluid intersects the feed jet flow and forms the quenching zone at a short distance apart from the nozzle opening of the feed jet nozzle. This distance may vary depending on the flow velocity of the feed jet flow (i.e. the pressure being applied and the dimensions of the nozzle flow channel) and the required residence time for growing the intended particle sizes (i.e. which particle sizes being intended). Thus the invention may apply a wide range of distances, depending on the actual process parameters being applied, but will in practice be applying a distance between the nozzle mouth and quenching zone from about 1 mm to about 100 mm. Experiments made by the inventor have shown that when applying a feed jet flow pressurised to a pressure in the range from $0.01 \cdot 10^5$ to $20 \cdot 10^5$ Pa above the pressure of the gas (or vacuum) in the free-space of the reactor chamber by a nozzle with an opening as specified in the first aspect of the invention, that the distance apart from the fed jet nozzle opening may advantageously be from 1 to 50 mm, or more preferably from one of the following ranges; from 1 to 30 mm, from 1 to 20 mm, from 1 to 10 mm, from 1 to 6 mm, and from 2 to 6 mm. By "distance apart from the nozzle opening" as used herein means the linear distance along the flow velocity vector of the jet flow from the opening of the injection nozzle injecting the jet flow to the first point of contact with flow velocity vector of the intersecting jet flow.

Another factor influencing the expansion of the feed jet flow after entering the free space of the reactor chamber is the pressure drop over the injection nozzle. The higher pressure drop, the faster flow rates of the feed jet flow and correspondingly less spatial expansion rates will be obtained. In practice, the invention may function with any pressure drop, i.e. pressure difference between the gas in the flow channel of the injection nozzle and the gas pressure in the bulk area of the reactor chamber, in one of the following ranges; from $0.01 \cdot 10^5$ to $20 \cdot 10^5$ Pa, from $0.015 \cdot 10^5$ to $15 \cdot 10^5$ Pa, from $0.015 \cdot 10^5$ to $10 \cdot 10^5$ Pa, from $0.02 \cdot 10^5$ to $5 \cdot 10^5$ Pa, from $0.25 \cdot 10^5$ to $2.5 \cdot 10^5$ Pa, from $0.25 \cdot 10^5$ to $2.0 \cdot 10^5$ Pa, from $0.3 \cdot 10^5$ to $1.5 \cdot 10^5$ Pa, or from $0.3 \cdot 10^5$ to $1.0 \cdot 10^5$ Pa.

The problem of expansion of the jet flow may be further alleviated by using flow guidance means which reduce the expansion of the jet flow when flowing into the free-space of the reactor chamber. These means may be in the form of internal flow guidance provided by the design of the flow channel of the injection nozzle and/or by use of external flow guidance means such as baffles etc. located at the opening of the injection nozzle. As mentioned above, the invention is not tied to any specific design of the injection nozzle except for providing a feed jet flow which has a rectangular cross-sectional area with an aspect ratio as given above. Apart from this restriction, any known or conceivable design of the feed jet injection nozzle able to produce a feed jet flow as described above may be applied including convergent, divergent, venturi-shaped, divergent-convergent nozzles.

Also, the invention is not tied to any specific means for external guidance of the jet flow. Any known or conceivable flow guidance means suitable for use in conjunction with injection nozzles for jet flows associated with vapour-phase synthesis methods of submicron- or nanoscale particles may be applied as an additional feature for guiding the feed jet flow and/or the at least one jet flow of cooling gas.

In one alternative embodiment, the design of the injection nozzle opening forming the jet flow of cooling fluid is given a similar rectangular design as the injection nozzle for the feed jet flow. That is, the injection nozzle for forming the jet flow of cooling fluid has a rectangular opening with width, $B_{quench}$, and height, $A_{quench}$, with aspect ratio ($B_{quench}/A_{quench}$) in one of the following ranges; from 10 000:1 to 2:1; from 2500:1 to 5:1; from 1000:1 to 5:1; from 750:1 to 5:1; from 400:1 to 10:1; from 200:1 to 10:1; or from 100:1 to 2:1; a height $A_{quench}$ in one of the following ranges; from 0.1 to 40 mm, from 0.15 to 35 mm, from 0.2 to 30 mm, from 0.25 to 25 mm, from 0.3 to 20 mm, from 0.4 to 15 mm, from 0.4 to 10 mm, from 0.5 to 10 mm, from 0.5 to 5 mm, from 0.75 to 5 mm, from 0.75 to 2,5 mm, from 1 to 2,5 mm, from 1 to 2 mm, from 0.1 to 2 mm, or 0.1 to 1 mm; and a pressure of the cooling fluid in the jet flow of cooling fluid when exiting the nozzle mouth in one of the following ranges above the reactor chamber pressure; from $0.01 \cdot 10^5$ to $20 \cdot 10^5$ Pa, from $0.015 \cdot 10^5$ to $15 \cdot 10^5$ Pa, from $0.015 \cdot 10^5$ to $10 \cdot 10^5$ Pa, from $0.02 \cdot 10^5$ to $5 \cdot 10^5$ Pa, from $0.25 \cdot 10^5$ to $2.5 \cdot 10^5$ Pa, from $0.25 \cdot 10^5$ to $2.0 \cdot 10^5$ Pa, from $0.3 \cdot 10^5$ to $1.5 \cdot 10^5$ Pa, or from $0.3 \cdot 10^5$ to $1.0 \cdot 10^5$ Pa.

By forming a jet flow of cooling fluid with a similar rectangular cross-section as the feed jet flow, it becomes possible to use a single jet flow of cooling fluid effectively quenching the entire jet feed gas in a very small spatial volume of the free-space reactor chamber if the jet flow of cooling fluid has a width which is at least as large as the width of the feed jet flow, i.e. the width, $B_{quench}$, of the opening of the injection nozzle for cooling fluid should be at least as large or larger than the width, $B_{feed}$, of the opening of the injection nozzle; $B_{quench} \geq B_{feed}$. The extra width of the jet flow of cooling fluid may advantageously be a trade-off between the need for ensuring cowering the entire width of the feed jet flow and avoiding using excessive amounts of cooling gas, such that in practice the extra width, $\Delta B$, may advantageously be one of the following; 1, 2, 3, 4, 5, 6, 7, 8, 9, or 10 mm. The extra width, $\Delta B$, is related to the widths of the injection nozzles as follows; $B_{quench} = B_{feed} + \Delta B$.

This feature provides the advantage of having a more simple apparatus and easier run conditions as compared to using several flows of cooling gas, and more importantly, to obtain an excellent control with the precipitation and particle growth kinetics and uniformity of the temperature gradients in the quenching zone. This effect is obtained by arranging the gas-knife resembling jet flow of cooling fluid such that the symmetry planes of the feed jet flow and the jet flow of cooling fluid intersects each other along a line that is substantially normal to the flow velocity vectors as shown schematically in FIG. 3. FIG. 3 shows only the symmetry planes of the jet flows to better illustrate the orientation of the jet flows. The feed jet flow is exiting an injection nozzle (not shown) and defines a symmetry plane 102 with flow velocity vector 106. From above the feed jet flow, a jet flow of cooling fluid is exiting a cooling fluid injection nozzle (not shown) and defines a symmetry plane 107 with flow velocity vector 108. At a distance D1 apart from the feed jet injection nozzle, the symmetry plane 102 of the feed jet flow is intersected by the symmetry plane 107 of the cooling jet flow along an intersection line 109. The distance between intersection line 109 and the opening of the cooling fluid injection nozzle is marked with D2. The symmetry planes are oriented such that they are inclined in relation to each other with an angle $\alpha_1$. In this embodiment, angle $\alpha 1$ constitutes the intersection angle between the feed jet flow and jet flow of cooling gas. The flow velocity vector 106 of the feed jet flow intersects the intersection line 109 at angle $\alpha_3$ and the flow velocity vector 108 of the jet flow of cooling fluid intersects the intersection line at angle $\alpha_2$.

It is advantageous to orient the jet flows such that angles $\alpha_1$, $\alpha_2$ and $\alpha_3$ are as close to perpendicular as practically obtainable. The invention may however apply intersection angle, $\alpha_1$, between the feed jet flow and the cooling jet flow in the range from 30 to 150° or in one of the ranges; from 45 to 135°, from 60 to 120°, from 75 to 105°, from 80 to 100°, or from 85 to 95°. This applies to the first and second aspect of the invention in general (i.e. including other embodiments than the one shown in FIG. 2). However, when applying the specific embodiment shown in FIG. 2, the intersection angles $\alpha_2$ and $\alpha_3$ may be in the range from 80 to 100°, or in one of the ranges from 85 to 95°, from 87 to 93°, from 88 to 90°, or from 89 to 91°. The term "substantially normal to the flow velocity vectors" used herein means that the intersection angles $\alpha_2$ and $\alpha_3$ are in the range from 80 to 100°.

The term "cooling fluid" as used herein means any known or conceivable gas or liquid suited for use as quenching medium in vapour-phase synthesis methods for manufacturing solid particles. The cooling fluid may be inert or reactive relative to the gas of the feed jet flow, depending on the actual vaporised material being applied and which type of particle is to be manufactured. The temperature of the cooling fluid should be sufficiently low to obtain a rapid quenching effect upon making contact with the gas of the feed jet flow being injected into the reactor chamber. However, the actual temperature difference between the gas of the feed jet flow and the jet flow of cooling fluid will depend on a set of case specific parameters such as i.e. the flow velocity (and thus the pressure) of the cooling fluid, the location of the intersection zone (where the quenching is taking place) that are to be applied, the of supersaturation in the feed jet flow, the reaction kinetics of the precipitation and the growth rates of the particles, and the intended sizes of the particles. Examples of suited temperature difference, $\Delta T$, between the gas of the feed jet flow and the cooling fluid may be in one of the ranges; from 50 to 3000° C., from 100 to 2500° C., 200 to 1800° C., from 200 to 1500° C., 300 to 1400° C., or from 500 to 1300° C. The pressure of the fed flow when exiting the nozzle opening may be in one of the following ranges above the reactor chamber pressure; ; from $0.01 \cdot 10^5$ to $20 \cdot 10^5$ Pa, from $0.015 \cdot 10^5$ to $15 \cdot 10^5$ Pa, from $0.015 \cdot 10^5$ to $10 \cdot 10^5$ Pa, from $0.02 \cdot 10^5$ to $5 \cdot 10^5$ Pa, from $0.25 \cdot 10^5$ to $2.5 \cdot 10^5$ Pa, from $0.25 \cdot 10^5$ to $2.0 \cdot 10^5$ Pa, from $0.3 \cdot 10^5$ to $1.5 \cdot 10^5$ Pa, or from $0.3 \cdot 10^5$ to $1.0 \cdot 10^5$ Pa.

The invention is not tied to production of any specific type of solid particles, but may be applied for manufacturing any known and conceivable particle which may be produced by vapour-phase synthesis methods and which may have any particle size in the range from 5000 to 1 nm. The invention may for instance be employed to make metal alloys by forming a fed jet flow consisting of a mixture of metal vapour of a first metal and metal vapour of a second metal and quenching the feed jet flow by a non-reactive fluid. This may be applied in general combination of all metals where configurations of alloys are thermodynamically feasible including alloys having meta-stable phases. Alternatively, the alloy particles may be formed by the organometallic approach which is available when the respective metal carbide is thermodynamically favourable at the processing conditions. In this case a secondary feed gas containing metal vapour and an organometallic compound is formed into a feed jet flow which is quenched with an inert cooling fluid. The organometallic will decompose when mixed with the hot metal vapour, and may thus produce pure alloys, or alloys containing carbon. Further, by employing a reactive quenching gas, the invention may form ceramics or other metal compounds with non-metallic elements by obtaining a simultaneous chemical reaction between the metal vapour and quenching resulting in the precipitation of the particles. An alternative configuration may involve employing a second inert cooling fluid jet subsequent to the mixing of the metal vapour and reactive quenching gas. These approaches may be employed to form nitrides by forming a feed jet flow of a metal vapour reactive towards nitrogen which is quenched with nitrogen gas. By quenching with oxygen gas instead of nitrogen gas, the invention may be applied to form metal oxide particles. Also, by applying a carbon containing secondary feed gas together with a metal vapour of a metal of which the carbide is thermodynamically favourable, the invention may be applied to form carbide particles.

In overview, in the present example embodiment of the invention, the quenching of the feed jet flow occurs essentially at a very small spatial volume of the free-space of the reactor chamber relative to the size of a corresponding prior art apparatus due to the relatively thin "gas-knives" which are made to intersect each other along an intersection line which is substantially normal to the flow velocity vectors as shown schematically in FIG. 3. Thus, substantially identical nucleation conditions for each submicron particle and/or nanoparticle nucleus is obtained and hence an improved control of particle characteristics, even at high submicron particle and/or nanoparticle production rates. The invention may employ recycling of the cooling fluid.

Moreover, the present invention may include means for employing wet collection of the micron-, submicron-, and/or nanoparticles and/or means for electrostatic precipitation for avoiding agglomerates. Wet collection of submicron particles and/or nanoparticles is beneficial, especially in a case of reactive nanoparticles which can be pyrophoric, for example aluminium, magnesium and nanothermite particles. From a viewpoint of recirculation of the cooling fluid and reducing agglomeration between micron-, submicron-, and/ or nanoparticles, it may be advantageous to employ an inert liquid for collecting the particles from the cooling fluid. Moreover, by re-circulating the cooling fluid and preventing strong agglomeration between submicron particles and/or nanoparticles by using an inert collecting liquid, corresponding dispersions and slurries, as compared to dry powders, provide a good starting point for further functionalization and for use as reactants in various wet chemical processes. A passivating oxidative layer, as employed conventionally for rendering nanoparticles easier to handle and transport in an oxygen rich environment, such as air, decreases the functional use of the nanoparticles; the present invention avoids a need to employ such oxide coatings on account of the product being in the form of a suspension or slurry.

The present invention seeks to address problems associated with contemporary vapour-to-solid processes for manufacturing micron-, submicron- and/or nanosized particles. Beneficially, the particles are formed by quenching vapour to solid at a defined small spatial region in contradistinction to other methods of manufacturing micron-, submicron- and/or nanosized particles wherein formation occurs over an extensive spatial region in which gradients of concentration and/or temperature occur. A "defined small spatial region" as used herein means a spatial region in the free-space of the reactor chamber in which substantially spatially isotropic conditions for the formation of particles exist. Such isotropy is impossible to make perfect, namely perfectly spatially uniform, so "isotropy" is beneficially defined as being less than 50% variation in physical parameters across the defined small spatial region, more preferable less than 5% variation, and most preferably less than 0.5% variation. A spatial region which can be considered a "defined small spatial region" will depend upon the aspect ratios and height of the injection nozzle openings, the distance between the nozzle openings and the intersection of the jet flows, and the expansion degree of the jet flows.

By employing a defined small spatial region wherein micron-, submicron-, and nanosized particles are formed results in a much more controllable, uniform and stable nucleation environment for all nuclei giving rise to submicron particles and/or nanoparticle manufacture. The present invention is beneficially of providing high production rates of submicron particles and/or nanoparticles by using high flow rates for the feed jet flow and the jet flow of cooling fluid through the defined small spatial region. The process of particle manufacture pursuant to the present invention is easily scalable by extending the defined small spatial region laterally by increasing the widths $B_{quench}$ and $B_{feed}$. Tailoring of micron-, submicron-, and/or nanosized particles is achievable by controlling relative temperature difference and flow rate of the feed and cooling fluid, in addition to changing heat capacity of the cooling fluid by using different inert gases or various mixtures thereof.

The continuous gaseous feed flow comprising a saturated vapour of the material is beneficially produced from a quantity of solid raw material, although the present invention is optionally implemented using liquids or gases to provide the gaseous feed flow; optionally, impure raw materials can be used to generate the gaseous feed flow gaseous feed flow. Optionally, raw materials are utilized which are decomposed by heat to yield decomposition products which are used to form the particles pursuant to the present invention; for example, the raw materials are beneficially organometallic materials which decomposed to metal, organic by products such as carbon dioxide, and water. However, whatever source of vapour is employed, the gaseous feed flow is adapted to undergo a phase transformation into solid when being cooled at the defined small spatial region at a sufficiently fast enough rate to manufacture micron-, submicron-, and/or nanosized particles.

Optionally, the apparatus includes a collecting chamber coupled via a passage in communication with the reaction chamber adapted so that micron-, submicron-, and/or nanosized particles manufactured in operation within the reaction chamber are collected within the collecting chamber. More optionally, the passage is provided with a cooling arrangement for cooling micron-, submicron-, and/or nanosized particles passing therethrough in operation. The cooling arrangement in cooperation with the passage are beneficial in reducing a tendency for manufactured micron-, submicron-, and/or nanosized particles to re-enter the reaction chamber, thereby providing for more optimal micron-, submicron-, and/or nanosized particles manufacturing conditions and maintaining potentially a higher particle manufacturing output. More optionally, the collecting chamber includes a collecting liquid flow arrangement for collecting micron-, submicron-, and/or nanosized particles and/or nanoparticles entering the collecting chamber into a collecting liquid. Use of the collecting liquid reduces a risk for loose micron-, submicron-, and/or nanosized particles agglomerating to form mutually bonded larger groups of micron-, submicron-, and/or nanosized particles which are subsequently difficult to separate. More optionally, the collecting liquid flow arrangement is operable to recirculate the collecting liquid through the collecting chamber. More optionally, the collecting chamber includes an electrostatic collecting arrangement (VB) for collecting micron-, submicron-, and/or nanosized particles transported in operation from the reaction chamber to the collecting chamber.

Optionally, the apparatus is implemented so that the arrangement for quenching the feed jet is operable to employ a jet of inert cooling fluid directed towards the defined small spatial region.

Optionally, the apparatus is adapted to be operated as a closed-loop system for re-circulating quenching and/or collecting liquids or gases therein.

Optionally, the apparatus may be adapted for introduction of an inert carrier gas in the evaporation chamber in order to form a diluted saturated material vapour with a partial vapour pressure close to thermodynamic equilibrium with the condensed phases of the material at the given temperature. This feature may be advantageous when producing small particles since the dilution reduces the growth rate by diminishing the mass concentration gradient (i.e. amount of available material vapour) in the particle-vapour boundary layer during the growth of the particles. The introduction of an inert carrier gas in the material vapour may thus provide an improved control of the particle growth.

Optionally, the apparatus is adapted to manufacture at least one of: micron elongate rodlike structures, micron elongate tube-like particles, micron elongate crystal-like particles, micron buckyball particles, submicron elongate rodlike structures, submicron elongate tube-like particles, submicron elongate crystal-like particles, submicron buckyball particles, nano-sized elongate rod-like structures, nano-sized elongate tube-like particles, nano-sized elongate crystal-like particles, nano-sized buckyball particles. Optionally, the method is adapted to manufacture substantially nanoparticles. Optionally, method is adapted to manufacture substantially submicron particles.

LIST OF FIGURES

Figure 4:
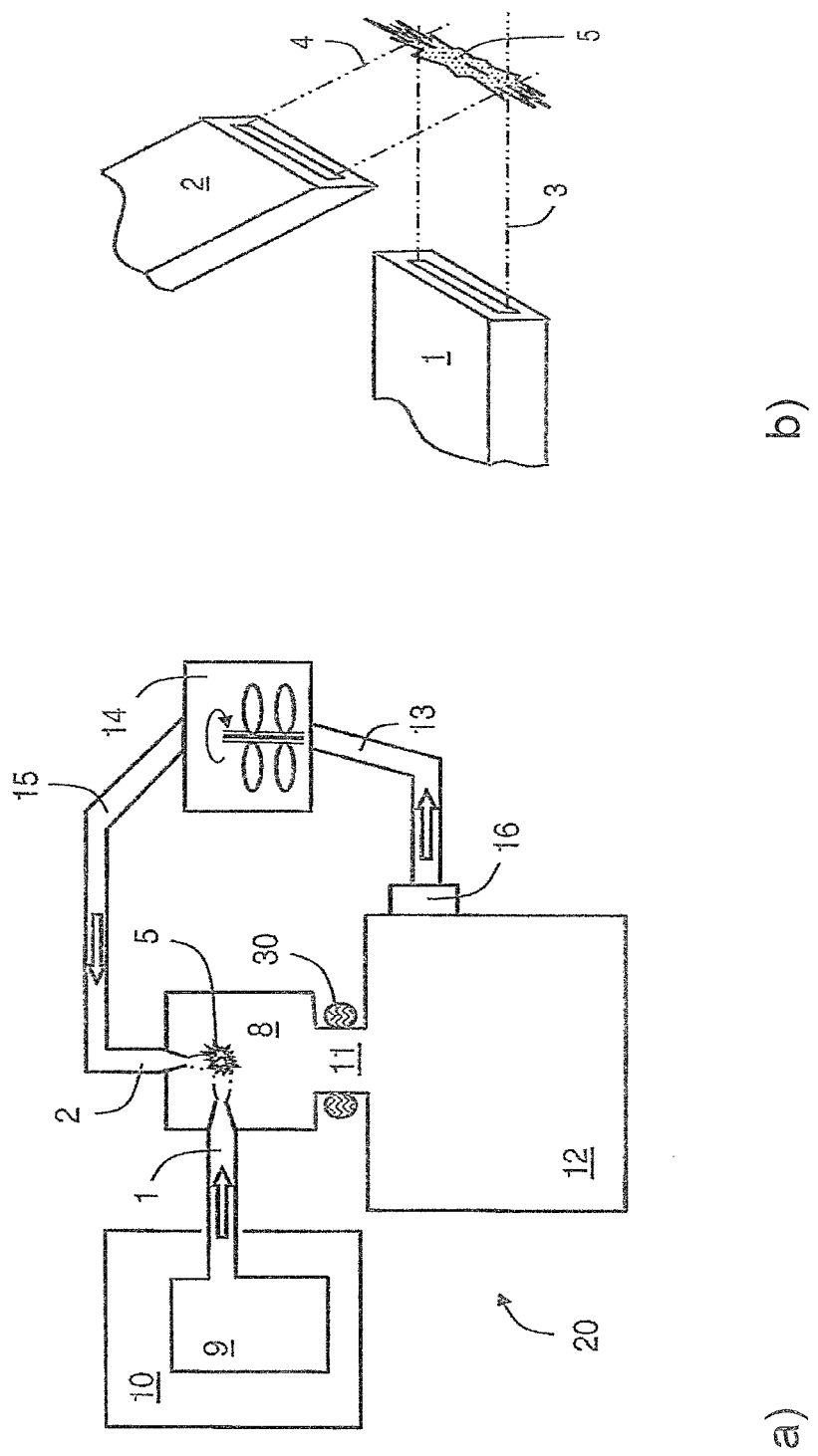

FIG. 4a) is a schematic drawing of an example embodiment of an apparatus according to the second aspect of the invention.

FIG. 4b) is a schematic drawing of an example embodiment of the nozzles for injecting the feed jet flow and jet flow of cooling fluid, respectively.

Figure 5:
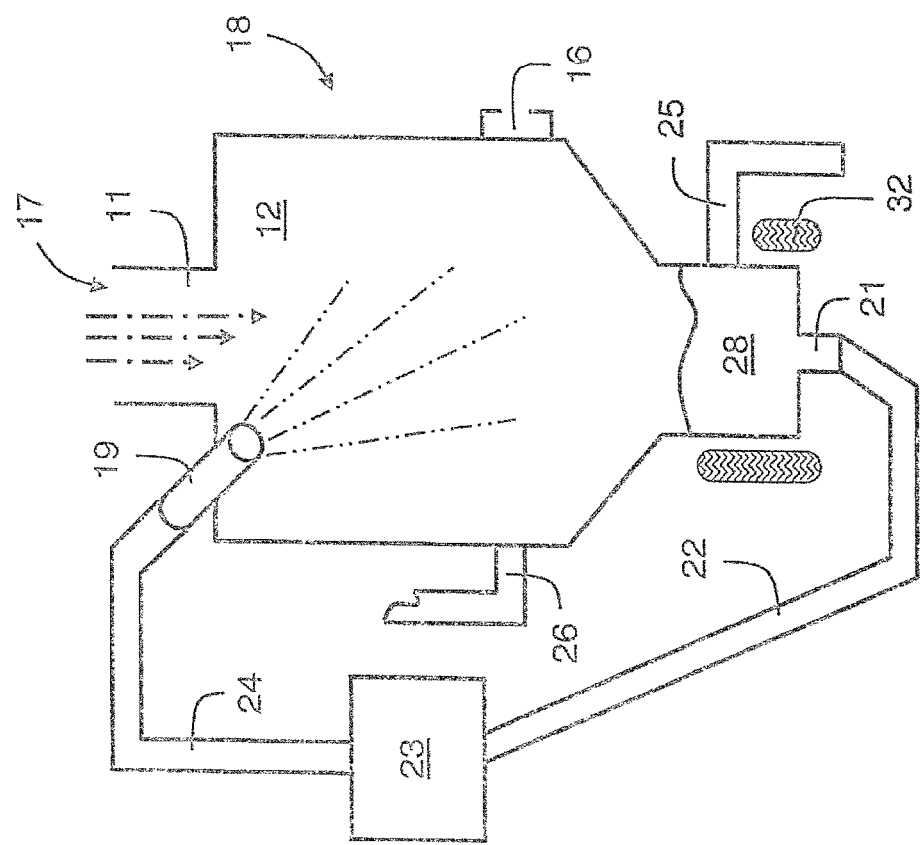

FIG. 5 is a schematic drawing of an example embodiment of a particle collector for capturing and extracting the manufactured based on liquid spray capture.

Figure 6:
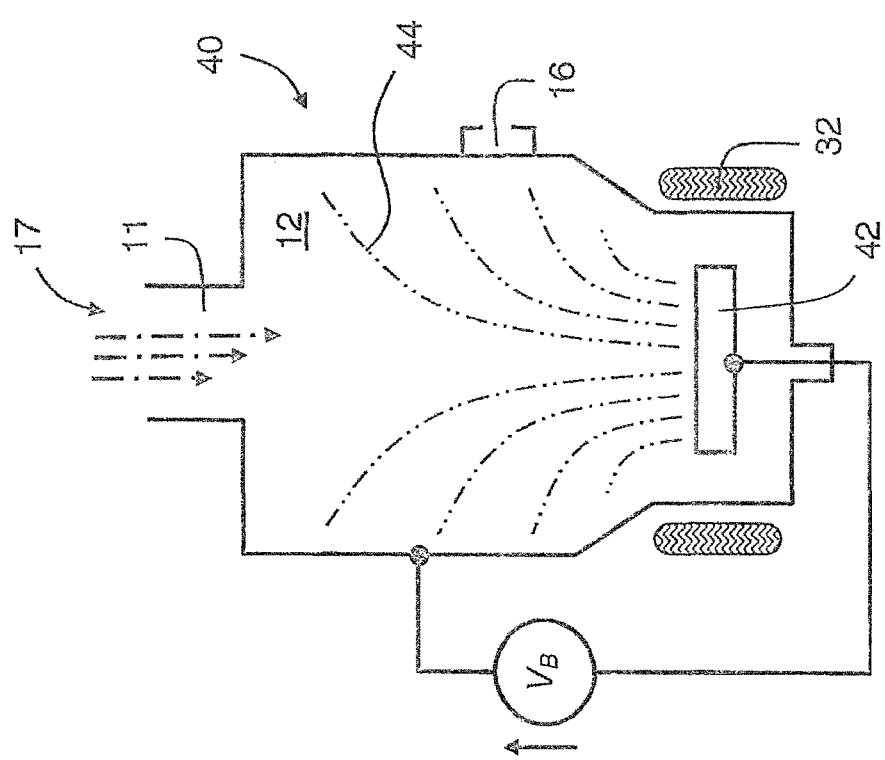

FIG. 6 is a schematic drawing of another example embodiment of a particle collector for capturing and extracting the manufactured particles based on electrostatic capture.

Figure 7:
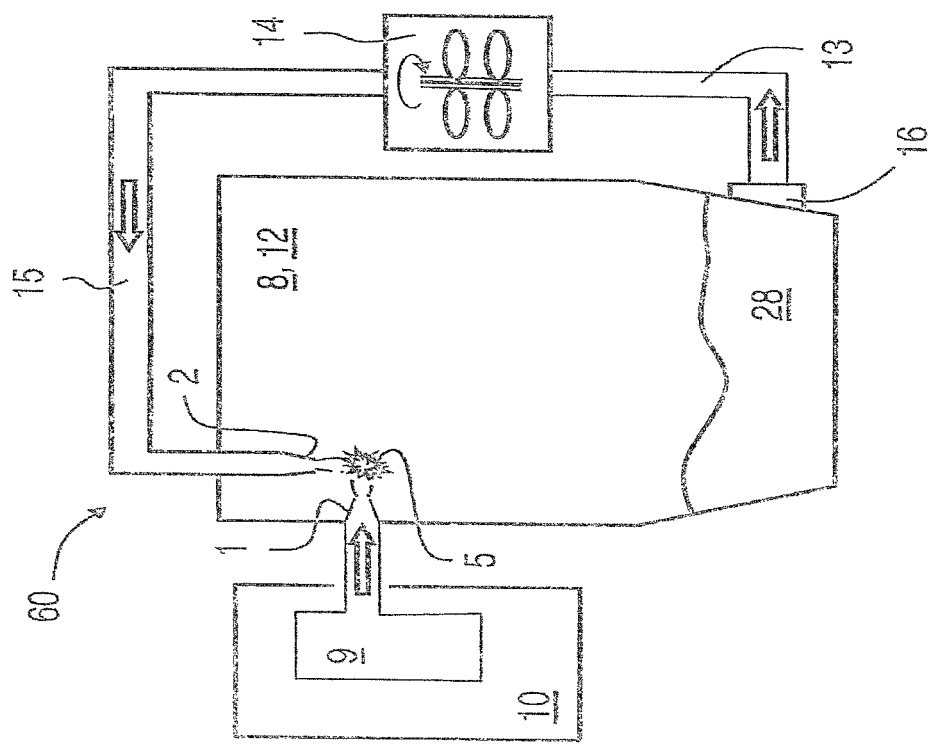

FIG. 7 is a schematic drawing of another of an apparatus according to the second aspect of the invention.

FIG. 8a) to f) are transmission electron microscope photographs of zinc particles made in verification tests 1 to 6 respectively.

DESCRIPTION OF EMBODIMENTS OF THE INVENTION

The invention will be described in greater detail by way of an example embodiment and verification tests performed by the example embodiment.

The example embodiment of an apparatus according to the second aspect of the invention is shown schematically in FIGS. 4a) and b). The apparatus pursuant to the present invention includes a first injection nozzle 1 in fluid communication with an evaporation chamber 9 for guiding a flow of saturated vapour therethrough and ejecting the vapour from an open end of the injection nozzle 1 as illustrated to form a feed jet 3. The apparatus further includes a second injection nozzle 2 for guiding a flow of cooling fluid therethrough for ejecting from an open end of the injection nozzle 2 to form a cooling jet 4. The feed jet 3 intersects the cooling jet 4 at a defined small spatial region 5 wherein micron-, submicron-, and/or nanosized particles are formed in spatially isotropic conditions. By controlling flow rates and compositions of the feed jet 3 and cooling jet 4, the particles are susceptible to assuming a spheroidal, elongate, tubular or planar form. A well controlled quality of micron-, submicron-, and/or nanosized particles is susceptible to being extracted continuously from the defined small spatial region 5.

As illustrated in FIG. 4b), the defined small spatial region 5 is laterally extensive to increase a rate of production of micron-, submicron-, and/or nanosized particles whilst retaining beneficial characteristics of well controlled micron-, submicron-, and/or nanosized particles production. By employing a sufficiently large difference in temperature and flow rate between the feed jet 3 and the cooling jet 4, production of particles in a micron-, submicron- and nanoscale size is achieved. Beneficially, the cooling jet 4 is inert to a material of the feed jet 3, for example the cooling jet 4 beneficially includes nitrogen, argon and/or helium. Either micron-, submicron-, or nanosized particles, or one or more of them simultaneously, are produced, depending upon parameters of the feed jet 3 and cooling jet 4 and physical conditions present in their environs.

The feed jet 3 is beneficially produced from a quantity of solid raw material, although the present invention is optionally implemented using liquids or gases to provide the feed jet 3; optionally, impure raw materials can be used to generate the feed jet 3. Optionally, raw materials are utilized which are decomposed by heat to yield decomposition products which are used to form micron-, submicron-, and/or nanosized particles pursuant to the present invention; for example, the raw materials are beneficially organometallic materials which decomposed to metal, organic by products such as carbon dioxide, and water. However, whatever source of vapour is employed, the feed jet 3 is adapted to undergo a phase transformation into solid when being cooled at the defined small spatial region 5 at a sufficiently fast enough rate to manufacture sub-micron particles and/or nanosized particles.

Figure 1:
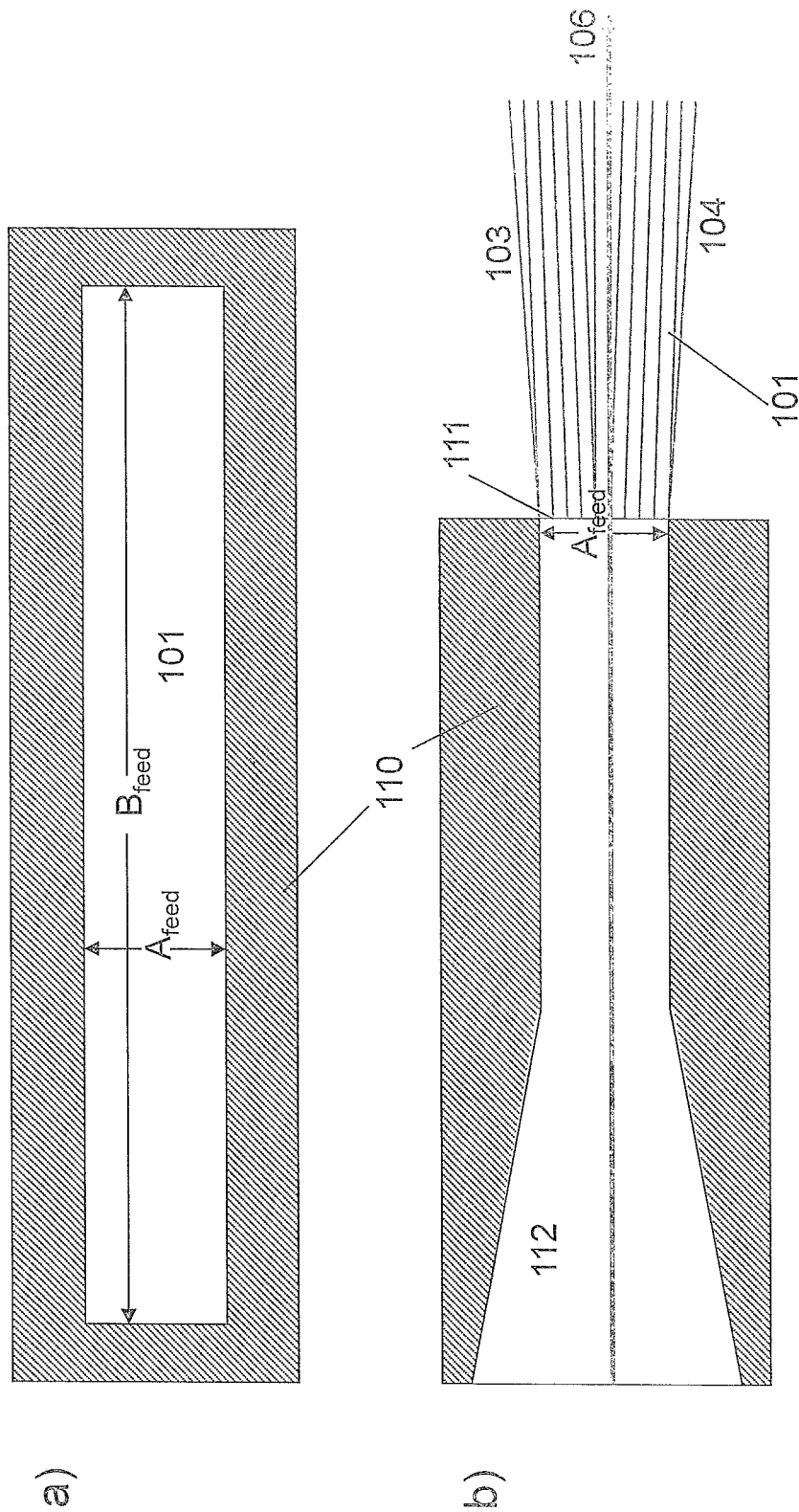
FIG. 1 is a schematic drawing showing an example embodiment of the nozzle opening with a rectangular cross-section, FIG. 1a) is seen from directly opposite the opening of the nozzle while FIG. 1b) show the same nozzle from the side.
Figure 2:
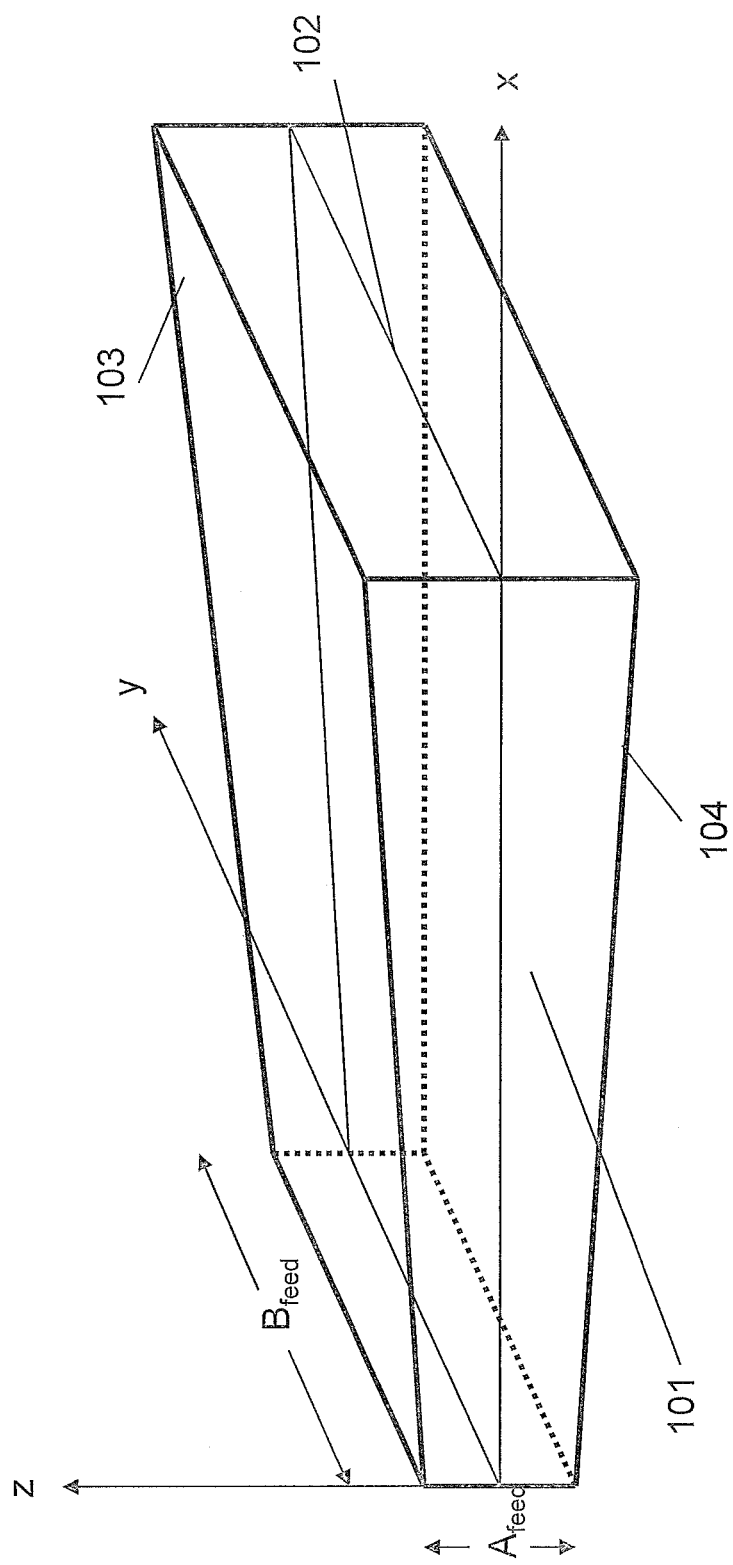
FIG. 2 is a schematic drawing illustrating a typical spatial extension of the feed jet flow after exiting the opening of the injection nozzle (not shown).

In FIG. 4a) the apparatus is indicated generally by 20. Processes as illustrated in FIGS. 1a) 1b), 2, 3, and 4b) occur within a reaction chamber 8 of the apparatus 20. Vapours for the feed jet 3 are generated by evaporating solid material included in an evaporation chamber 9 in a feed-system 10 for provision of a continuous gaseous feed flow of saturated vapour. The evaporation chamber 9 is coupled in communication with the vapour carrying injection nozzle 1 which leads into the reaction chamber 8. Moreover, the evaporation chamber 9 is further adapted so that volume expansion of material from the evaporation chamber 9 resulting from phase transformation of the material and associated increase in temperature is operable to transport the vapour trough the injection nozzle 1 and into the reaction chamber 8. In the feed-system 10, a suitable heating source is employed to heat the raw material contained in the evaporation chamber 9. The heating source is susceptible to being implemented in several different ways; for example, by direct resistive heating, by induction heating, by electron beam heating, by laser heating, by microwave heating or any combinations of such heating can be used. The raw material included within the evaporation chamber 9 for evaporation will often initially be a solid metal, but use of the apparatus 20 is not limited to evaporation of metallic materials, for example as aforementioned.

The reaction chamber 8 is coupled in communication via a passage 11 to a collecting chamber 12. Optionally, the passage 11 is provided with an arrangement 30 for cooling fluids and particles passing there through. Such cooling can be conveniently achieved by using, for example, Peltier-type electro-thermal cooling elements, a heat pump apparatus providing refrigeration, a flow of cooling liquid around at least a portion of a wall of the passage 11, a helium evaporator or similar. On account of the cooling fluid flowing from the reaction chamber 8 to the collecting chamber 12 having a high flow rate in comparison to the vapour gas provided via the injection nozzle 1, as appropriate, the cooling fluid efficiently carries manufactured submicron particles and/or nanoparticles from the reaction chamber 8 to the collecting chamber 12. In the collecting chamber 12, the manufactured micron-, submicron-, and/or nanosized particles are separated from the cooling fluid, namely cooling fluid supplied via the injection nozzle 2. Non-exhaustive examples of approaches for separating the manufactured micron-, submicron-, and/or nanosized particles from the cooling fluid include one or more of: filters, electrostatic precipitation, magnetic field precipitation, liquid collection system. When the cooling fluid has had its particles removed therefrom, the cooling fluid is extracted from the chamber 12 through a valve 16 and then via a connecting pipe 13 into a pumping unit 14 wherein the cooling fluid is compressed, and its temperature is then regulated before it is conveyed via a pipe connecting pipe 15 to the reaction 8 for re-ejection from the injection nozzle 2 as aforementioned. The cooling fluid, for example an inert gas such as helium and/or argon, is thus recirculated within the apparatus 20 which enables economically efficient operation in relation to use of gaseous materials whilst maintain a high production rate of submicron particles and/or nanoparticles; in other words, the apparatus 20 employs a closed-loop recirculation of cooling and transport fluid employed to the form the micron-, submicron-, and/or nanosized particles which is synergistically highly beneficial.

The crucible containing the material, the evaporation chamber 9, and its associated injection nozzle 1 are optionally manufactured from graphite and are heated by way of induction heating. Moreover, the evaporation chamber 9 is optionally filled with a gas providing an inert or reducing atmosphere for ensuring less degradation of material from which the crucible and evaporation chamber 9 is constructed. For providing a continuous feed of raw material to the reaction chamber 8, an alternative optional approach is to employ multiple evaporation chamber 9 with multiple associated heaters to ensure enhanced operating reliability and/or a continuous long term supply of material to the reaction chamber 8. An optional configuration for the evaporation chamber 9 is a series of crucibles, wherein a first of the crucibles is employed in operation to melt material from a solid state to a molten state, and second of the crucibles is employed in operation to receive molten material from the first crucible and to evaporate the molten material to form a corresponding vapour to be supplied to the injection nozzle 1. Optionally, the first crucible is a large reservoir crucible, and the second crucible is a relatively smaller high-temperature crucible. Such a series arrangement is of benefit in that material can be added to the first crucible without immediately affecting operation of the second crucible. Optionally, the injection nozzle 1 is provided with heat energy to reduce any tendency for vapour to condense on inside walls of the nozzle.

Optionally, the apparatus 20 is adapted to operate such that solid raw material is evaporated in the evaporation chamber 9 at just above a boiling temperature of the material to produce corresponding vapour in contradistinction to superheated vapours which are contemporarily employed at atmospheric pressure. This effectively enables the evaporation chamber 9 and its one or more crucibles to function by distilling the raw material; impurities having a lower boiling temperature in the raw material are evaporated and subsequently beneficially collected in a cold trap and thus prevented from entering into the reaction chamber 8, thereby potentially producing highly pure micron-, submicron-, and/or nanosized particles.

Impurities having a higher boiling temperature than the material itself remain in the one or more crucibles and are beneficially periodically drained away. Such a distillation manner of operation enables material of lower purity to be used in the one or more crucibles of the evaporation chamber 9 whilst the apparatus 20 is capable of producing highly pure micron-, submicron-, and/or nanosized particles from the reaction chamber 8.

The collecting chamber 12 can be implemented in various different manners. In FIG. 5, an example implementation of the collecting chamber 12 and its associated components is indicated generally by 18. The chamber 12 employs a liquid 28 to collect micron-, submicron-, and/or nanosized particles transported by cooling fluid indicated by 17 entering via the passage 11 into the chamber 12. As the cooling fluid with particles 17 flows into the collecting chamber 12, they are met by a spray of liquid generated by a nozzle 19. The spray of liquid from the nozzle 19 is adjustable in its form and nature by varying a type of nozzle employed and a pressure which is employed to force the liquid through the nozzle 19. The liquid 28 is inert or non-inert depending upon requirements. Beneficially, the liquid 28 is inert so that it does not chemically react with the Submicron particles and/or nanoparticles collected therein in operation. Moreover, the liquid 28 is collected at a bottom region of the collecting chamber 12. Various cooling arrangements 32, for example via use of water-cooled plates or coils, cooling heat pumps and similar, is beneficially employed in association with the chamber 12, for example within the chamber 12, to control the temperature of the liquid 28.

When a volatile liquid 28 is employed within the collecting chamber 12, it is desirable that the liquid is not lost via the valve 16 and inadvertently introduced into the reaction chamber 8. Such loss of the liquid 28 can cause contamination of the cooling fluid. The liquid 28 is beneficially pumped from the collecting chamber 12 through a valve 21 and subsequently through a pipe 22 to a liquid pump 23. The pump 23 is operable to pump the liquid 28 through a pipe 24 to the nozzle 19 for spraying into the collecting chamber 12 for purpose of capturing submicron particles and/or nanoparticles transported through the passage 11.

In the collecting chamber 12 of FIG. 5, the liquid 28 can be used continuously so that its micron-, submicron-, and/or nanoscaled particle concentration increases continuously as it collects more particles. When the liquid 28 has attained a threshold particle concentration, at least a portion of the liquid 28 is optionally drained from the collecting chamber 12 via a tap 25. Fresh liquid 28, for example devoid of micron-, submicron-, and/or nanosized particles, is beneficially introduced via a second tap 26, thereby ensuring that a minimum level of the liquid 28 in the collecting chamber 12 is maintained during operation. On account of the liquid 28 forming a gas membrane at its upper surface, the liquid 28 can be drained from and filled into the collecting chamber 12 without significantly affecting its gas environment; as aforementioned, the gas environment within the apparatus 20 is beneficially inert and closed-loop for efficiency of use of materials.

The liquid 28 including micron-, submicron-, and/or nanosized particles extracted from the collecting chamber 12 can beneficially be used directly in applications, for example for manufacturing specialist coatings, paints, surface layers on substrates such as glass and metal, medicines, cosmetics, electrodes for batteries, electrodes for fuels cells, reactants for wet chemical processes and so forth to mention merely a few examples. Alternatively, the liquid 28 including micron-, submicron-, and/or nanosized particles can be processed to remove micron-, submicron-, and/or nanosized particles from the extracted liquid 28 so that they can be utilized in other processes, for example for manufacturing high-strength fibres, dense composites, and so forth. Sintered silicon carbide components manufactured pursuant to the present invention are described in the foregoing.

As aforementioned, the apparatus 20 is susceptible to being optionally modified so that collecting chamber 12 employs electrostatic precipitation as an alternative to liquid collection of manufactured micron-, submicron-, and/or nanosized particles; such an implementation of the apparatus 20 is illustrated in FIG. 6 and indicated generally by 40. The apparatus 40 is implemented so that its collecting chamber 12 is fabricated with conductive side walls, for example from Hastelloy which is a corrosion-resistant conductive steel alloy; "Hastelloy is a trade mark of Haynes International Inc. Hastelloy is a steel alloy which employs nickel as a principal alloying ingredient. Other optional alloying elements included in Hastelloy include one or more of: molybdenum, chromium, cobalt, iron, copper, manganese, titanium, zirconium, aluminium, carbon and tungsten. Hastelloy and similar materials, for example Inconel and similar ferritic austenitic steels, when used for the apparatus 20, 40, can withstand corrosive materials and high temperatures, thereby enabling the apparatus 20, 40 to cope with a large spectrum of micron-, submicron-, and/or nanosized particles; optionally, Hastelloy or similar is also employed in the construction of the apparatus 20. The apparatus 40 further includes an electrically-insulated stage or platter 42 coupled via an electrostatic biasing circuit VB to the walls of the chamber 12. Optionally, the platter or stage 42 is magnetically levitated and flexible electrical connections are made thereto in a manner shielded from micron-, submicron-, and/or nanosized particles to prevent any risk of short-circuit paths being created in operation from the platter or stage 42 to the walls of the collecting chamber 12 by isotropic deposition of micron-, submicron-, and/or nanosized particles. Optionally, the passage 11 is provided with a UV source for ionizing the micron-, submicron-, and/or nanosized particles to cause them to be mutually repelled to reduce a risk of mutual agglomeration and also to enable them to be accelerated by an electric field 44 created in the collecting chamber 12 so that the micron-, submicron-, and/or nanosized particles are embedded with force onto the stage or platter 42, or any object or substrate placed thereupon in operation; optionally, UV radiation is employed in other regions of the apparatus 40. Optionally, the collecting chamber 12 of the apparatus 40 includes a cooling arrangement 32 as aforementioned. Use of UV to reduce micron-, submicron-, and/or nanosized particles is also possible to employ in the apparatus 20, for example in the reaction chamber 8, in the passage 11 or in the collecting chamber 12 or any combination thereof. Optionally, the platter or stage 42 is provided with a gas interlock (not shown) so that it can be introduced and removed from the collecting chamber 12 without disturbing a gas balance within the apparatus 40.

The apparatus 20 is susceptible to being simplified to generate an apparatus as illustrated in FIG. 7 and indicated generally by 60. In the apparatus 60, there is provided a combined reaction chamber and collecting chamber 8, 12 wherein the liquid 28 is pumped via a pump 14 to generate a quenching spray from the injection nozzle 2 towards the feed jet from the crucible via the injection nozzle 1. Jet flows from the injection nozzles 1, 2 meet at a defined small spatial quenching region 5 as a transverse line in which micron-, submicron-, and/or nanosized particles are generated and swept to a bottom of the chamber 8, 12 by the quenching liquid 28 which performs synergistically also as a collecting liquid 28. Fresh liquid 28 is beneficially added periodically to the chamber 8, 12 in operation, and liquid 28 including micron-, submicron-, and/or nanosized particles removed from the apparatus 60. Extraction and filing of liquid to and from the apparatus 60 is beneficially performed periodical and/or on a continuous basis. The apparatus 60 constitutes a closed system which is capable of operating on a continuous basis. Optionally, there are multiple crucibles provided in the evaporation chamber 9 for ensuring reliable supply of vapour via the injection nozzle 1 to the defined small spatial region 5.

The apparatus 20, 40, 60 are capable of providing micron-, submicron-, and/or nanosized particles for use in active devices such as advanced solar cells and advanced light emitting devices. For example, dendritic elongate nanoparticles fabricated from Zinc Oxide are capable of emitting white light when an electrical current is passed therethrough. By way of giant plasmon resonances occurring therein, nanoparticles are capable of forming a basis for solar cells for sustainable electrical power generation from sunlight ("green renewable energy"). Moreover, nanoparticles can be employed to manufacture conductive polymers and thereby printable electronic circuits.

Although the apparatus 20, 40, 60 are described in the foregoing for manufacturing micron-, submicron-, and/or nanosized particles, conditions at the defined small spatial region 5 can modified for manufacturing micron-, submicron-, and nanosized rod-like structures, tube-like structures, for example elongate nano crystals, elongate nanorods and elongate nanotubes as well as buckyballs. Such nanorods and nanotubes are of benefit in manufacturing quantum mechanics light emission devices stimulated by electrical currents.

Verification of the Invention

In order to verify the effect of the invention, an apparatus according to the embodiment shown in FIGS. 4a), 4b) and 5 was used to evaporate samples of elementary zinc and made to submicron and/or nanosized particles.

Figure 3:
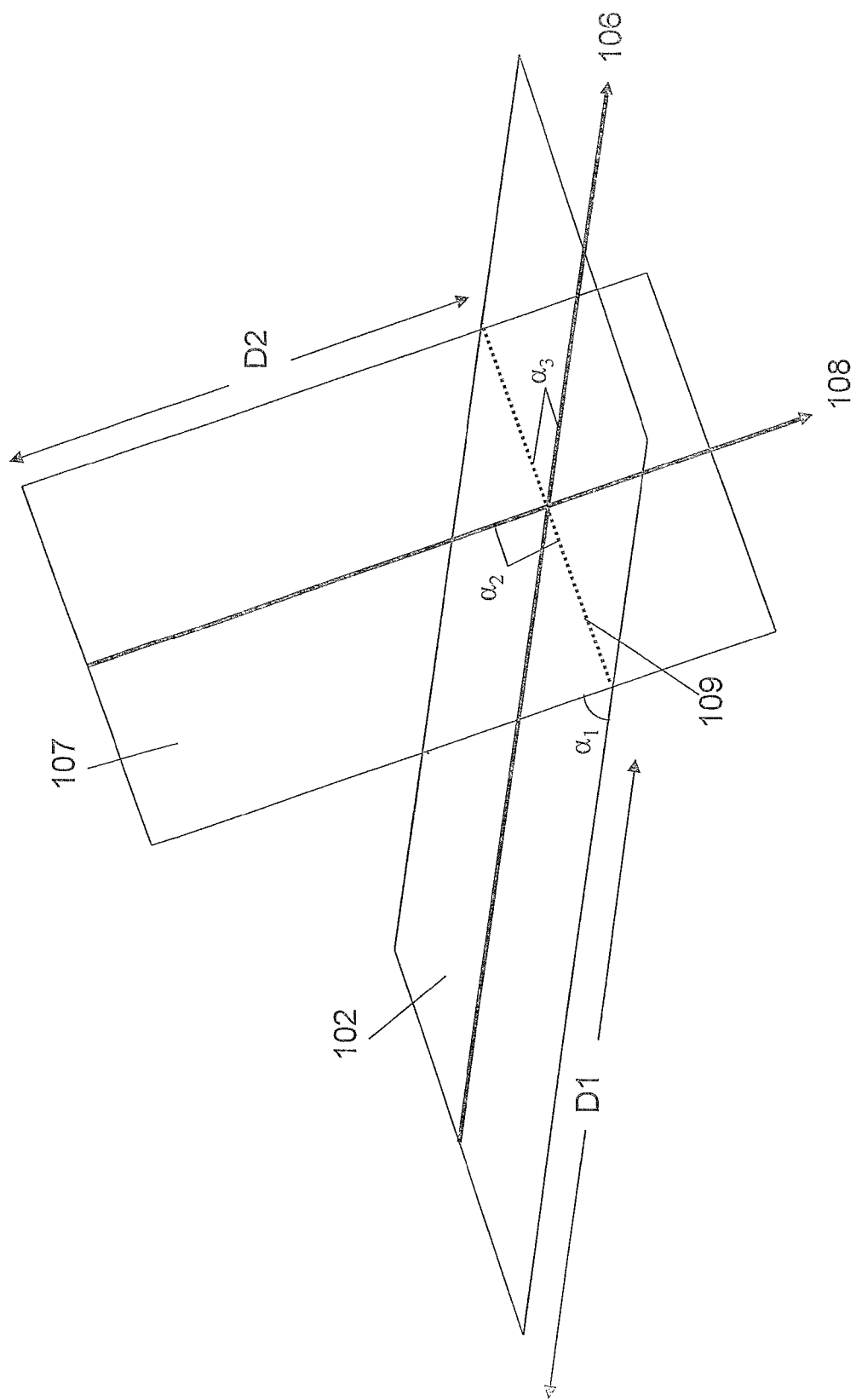
FIG. 3 is a schematic drawing illustrating the orientation of the symmetry planes of the feed jet flow and jet flow of cooling fluid, respectively, according to an example embodiment of the invention.

Common to all tests is that the zinc metal was heated until evaporation in an encapsulated graphite container with a graphite gas outlet shaped into an injection nozzle with a rectangular cross-section of the nozzle opening. Both the graphite container and the injection nozzle were heated by induction to maintain a temperature of 907-1050° C. to form a steady and continuous flow of saturated zinc vapour at its boiling point temperature (907° C.) through the injection nozzle and into the reactor chamber as a feed jet shaped into a "gas-knife". The cooling fluid was nitrogen gas at approx. room temperature, and which was injected through an injection nozzle made of quartz ($SiO_2$) with a rectangular opening forming a "gas-knife" of cooling fluid. The two gas-knifes were oriented as shown in FIG. 3 with angles $\alpha 1$, $\alpha 2$, and $\alpha 3$ of approximately 90°. After colliding with each other, the gases with entrained particles flow through a passage into a collection chamber where the gas is subject to a spray of white spirit to collect the particles. Each test was run until all of the metal zinc sample hade evaporated.

The tests were run with different sizes of the injection nozzles. The test parameters are summarised in Table 1, and the resulting zinc particles are presented by scanning microscope photographs displayed in FIGS. 8a) to f). The width of the injection nozzles corresponds to the distance indicated by arrows B while the height corresponds to the distance indicated by arrows A in FIG. 1. The distance D1 is the distance along the flow velocity vector of the feed jet flow from the feed nozzle opening to the intersection point of the flow velocity vector of the jet flow of cooling gas, while the distance D2 is the distance along the flow velocity vector of the jet flow of the cooling fluid from the cooling fluid nozzle opening to the intersection point of the flow velocity vector of the feed jet flow.

TABLE 1

Process parameters employed in verification tests

| Parameter | Test nr. | | | | | |
|---|---|---|---|---|---|---|
| | 1 | 2 | 3 | 4 | 5 | 6 |
| Width feed nozzle [mm] | 35 | 11 | 11 | 20 | 20 | 20 |
| Height feed nozzle [mm] | 2 | 1 | 1 | 1 | 1 | 1 |
| Width cooling nozzle [mm] | 37 | 13 | 13 | 22 | 22 | 22 |
| Height cooling nozzle [mm] | 1 | 1 | 1 | 1 | 1 | 1 |
| Distance D1 [mm] | 6 | 4 | 4 | 3 | 2 | 2 |
| Distance D2 [mm] | 10 | 6 | 3 | 3 | 2 | 2 |
| Flow rate nitrogen gas [m$^3$/h] | 2 | 2 | 2 | 2 | 2 | 1.2 |
| Flow rate feed gas [g/min] | 14.6 | 10.5 | 10.5 | 20 | 13.2 | 9.7 |
| Amount Zn in sample [g] | 146 | 178 | 243 | 250 | 370 | 340 |

REFERENCES

1. Mark T. Swihart (2003), "Vapor-phase synthesis of nanoparticles", *Current Opinion in Colloid and Interface Science*, Vol(8), pp. 127-133.
2. Frank Einar Kruis (2001), "Synthesis of nanoparticles in the gas phase for functional applications", *Habilitation thesis accepted by: University of Duisburg, Department of electrical engineering*, 2001-06-01, Germany, pp. 19-28.

The invention claimed is:

1. A method for manufacturing solid particles of a material, where the method comprises:
   forming a continuous gaseous feed flow comprising a saturated vapor of the material, and injecting the continuous gaseous feed flow through an inlet into a free-space region of a reactor chamber in the form of a feed jet flow protruding from the inlet, and
   forming one continuous jet flow of a cooling fluid and injecting the jet flow of cooling fluid into the reaction chamber, quenching the saturated vapor of the material with the cooling fluid to form the solid particles, and capturing and extracting the solid particles in a particle collector,
   wherein the feed jet flow is made by passing the feed flow at a pressure in the range from $0.01 \cdot 10^5$ to $20 \cdot 10^5$ Pa above the reactor chamber pressure through an injection nozzle functioning as the reactor inlet and which has a rectangular cross-sectional area of the nozzle opening with height $A_{feed}$ and width $B_{feed}$, where
   the aspect ratio $B_{feed}/A_{feed}$ is >2:1, and
   the height $A_{feed}$ is in the range from 0.1 to 40 mm, and
   the jet flow of cooling fluid is made by passing the cooling fluid through an injection nozzle which directs the jet flow of cooling fluid such that it intersects the feed jet flow, and where the jet flow of cooling fluid mixes with substantially all of the gas of the feed jet flow at a distance apart from the nozzle opening for injection of the feed jet flow,
   wherein the jet flow of cooling fluid is formed by employing an injection nozzle with a rectangular cross-section of the nozzle opening having:
      width, $B_{quench}$, and height, $A_{quench}$, with an aspect ratio ($B_{quench}/A_{quench}$) in the range of from 10 000:1 to 2:1;
      height $A_{quench}$ is in the range of from 0.1 to 40 mm; and a pressure of the cooling fluid in the jet flow of cooling fluid when exiting the nozzle mouth in the ranges above the reactor chamber pressure of from $0.01 \cdot 10^5$ to $20 \cdot 10^5$,
   wherein the feed jet flow and the jet flow of cooling fluid are oriented such that the symmetry planes of the flows intersect each other along an intersection line a distance D1 apart from the injection nozzle opening forming the feed jet flow and a distance D2 apart from the injection nozzle opening forming jet flow of cooling gas, the symmetry planes are inclined in relation to each other with an angle α1, and the flow velocity vector of the feed jet flow intersects the intersection line at angle α3 and the flow velocity vector of the jet flow of cooling fluid intersects the intersection line at angle α2, and
   wherein the intersection angle, α1, is in the range of from 30 to 150° and the intersection angles α2 and α3 are in the range of from 80 to 100°.

2. The method according to claim 1, wherein the feed jet flow is made by passing the feed flow through an injection nozzle with an aspect ratio ($B_{feed}/A_{feed}$) in the range of from 2500:1 to 5:1, and a height $A_{feed}$ in the range of from 0.4 to 15 mm, and where the pressure of the feed is in the range above the reactor chamber pressure of from $0.02 \cdot 10^5$ to $5 \cdot 10^5$ Pa.

3. The method according to claim 1, wherein:
   the at least one jet flow of cooling fluid intersects the feed jet flow with an intersection angle, $α_1$, between 30 and 150° at distance apart from the fed jet nozzle opening of from 1 to 30 mm; and
   the temperature difference, ΔT, between the cooling fluid and the gas of the feed jet flow is in the range of from 50 to 3000° C.

4. The method according to claim 1, wherein the jet flow of cooling fluid is formed by employing an injection nozzle with a rectangular cross-section of the nozzle opening having width, $B_{quench}$, and height, $A_{quench}$, with an aspect ratio ($B_{quench}/A_{quench}$) in the range of from 200:1 to 10:1; a height $A_{quench}$ in the range of from 0.1 to 2 mm; and a pressure of the cooling fluid in the jet flow of cooling fluid when exiting the nozzle mouth in the range above the reactor chamber pressure of from $0.01 \cdot 10^5$ to $20 \cdot 10^5$ Pa.

5. The method according to claim 1, wherein the feed jet flow is made by passing the feed flow through an injection nozzle with an aspect ratio ($B_{feed}/A_{feed}$) in the range of from 200:10 to 10:1, and a height $A_{feed}$ in the range of from 0.1 to 2 mm, and where the pressure of the feed is in the range above the reactor chamber pressure of from $0.02 \cdot 10^5$ to $5 \cdot 10^5$ Pa.

6. The method according to claim 1, wherein the intersection angle α1 is in the range of from 75 to 105°, and the intersection angles α2 and α3 are in the range of from 87 to 93°.

7. The method according to claim 1, wherein $B_{quench} \geq B_{feed} B_{feed}$.

8. The method according to claim 1, wherein $B_{quench} = B_{feed} + \Delta B$, where ΔB is 4 mm.

9. The method according to claim 1, wherein the feed gas is evaporated zinc and the cooling fluid is nitrogen gas.

10. The method according to claim 1, wherein the feed gas is a mixture of two or more vaporized materials.

11. The method according to claim 10, wherein the feed gas is one of the following: a mixture of two or more metal vapors; a mixture of at least one metal vapor and at least one gaseous non-metallic compound; or a mixture of at least one metal vapor and at least one inert gas.

12. The method according to claim 1, wherein the particles being produced have an external diameter in the range of from 1 nm to 5 μm.

13. A method according to claim 1, wherein $B_{quench} = B_{feed} + \Delta B$, where ΔB is 10 mm.

14. A method according to claim 1, wherein the particles being produced have an external diameter in the range of from 100 to 1000 nm.

15. A method according to claim 1, wherein the particles being produced have an external diameter in the range of from 1 to 2 μm.

16. An apparatus for manufacturing solid particles of a material, where the apparatus comprises:
a feed-system for provision of a continuous gaseous feed flow comprising a saturated vapor of the material and where the feed flow is pressurized to a pressure in the range from $0.01 \cdot 10^5$ to $20 \cdot 10^5$ Pa above the reactor chamber pressure;
a system for provision of at least one continuous supply flow of a cooling fluid;
a reactor having a free-space chamber, an outlet for gas and a particle collector for capturing and extracting the manufactured solid particles;
an injection nozzle for injection of the feed jet flow in fluid connection with the continuous gaseous feed flow and which is located such that it injects the feed flow in the form of a feed jet flow protruding from an injection opening of the nozzle into the free-space region of the reaction chamber; and
an injection nozzle for injecting a jet flow of cooling fluid in fluid connection with the continuous supply and which injects a jet flow of cooling fluid into the reaction chamber,
wherein the injection nozzle opening for injection of the feed jet flow has a rectangular cross-sectional area with height $A_{feed}$ and width $B_{feed}$, where
the aspect ratio $B_{feed}/A_{feed}$ is ≥to 2:1 and
the height $A_{feed}$ is in the range from 0.1 to 40 mm, and
the injection nozzle for injecting the jet flow of cooling fluid has a nozzle opening forming a jet flow of the cooling fluid and which is located such that the jet flow of cooling fluid intersects the feed jet flow, and which, either individually or combined, mixes with substantially all of the gas of the feed jet flow at a distance apart from the nozzle opening for injection of the feed jet flow, and where:
the injection nozzle for injecting the jet flow of cooling fluid has a rectangular cross-section of the nozzle opening with width, $B_{quench}$, and height, $A_{quench}$, forming an aspect ratio ($B_{quench}/A_{quench}$) in the range of from 10 000:1 to 2:1; and
the height $A_{quench}$ is in the range of from 0.1 to 40 mm,
wherein the injection nozzle for injection of the feed jet flow and the injection nozzle for injecting the at least one jet flow of cooling fluid are oriented such that:
the symmetry planes of the jet flows intersect each other along an intersection line a distance D1 apart from the injection nozzle opening forming the feed jet flow and a distance D2 apart from the injection nozzle opening forming jet flow of cooling gas;
the symmetry planes are inclined in relation to each other with an angle $\alpha_1$; and
the flow velocity vector of the feed jet flow intersects the intersection line at angle α3 and the flow velocity vector of the jet flow of cooling fluid intersects the intersection line at angle α2, and
wherein the intersection angle, α1, is in the range of from 30 to 150°, and the intersection angles α2 and α3 are in the range of from 80 to 100°.

17. An apparatus according to claim 16, wherein the injection nozzle opening for injection of the feed jet flow has an aspect ratio ($B_{feed}/A_{feed}$) in the range of from 2500:1 to 5:1, and a height $A_{feed}$ in the range of from 0.4 to 15 mm.

18. An apparatus according to claim 16, wherein the injection nozzle for injection of the feed jet flow and the injection nozzle for injecting the jet flow of cooling fluid are oriented such that the feed jet flow and the at least one jet flows of cooling fluid intersects each other at distance, D1, apart from the feed jet nozzle opening in the range of from 1 to 30 mm.

19. An apparatus according to claim 16, wherein the injection nozzle for injecting the jet flow of cooling fluid has a rectangular cross-section of the nozzle opening with width, $B_{quench}$, and height, $A_{quench}$, forming an aspect ratio ($B_{quench}/A_{quench}$) in the range of from 200:1 to 10:1, and the height $A_{quench}$ is in the range of from 0.1 to 2 mm.

20. An apparatus according to claim 16, wherein the injection nozzle opening for injection of the feed jet flow has an aspect ratio ($B_{feed}/A_{feed}$) in the range of from 100:1 to 2:1, and a height $A_{feed}$ in the range of from 0.1 to 2 mm.

21. An apparatus according to claim 16, wherein the intersection angle, α1, is in the range of from 75 to 105°, and the intersection angles α2 and α3 are in the range of from 87 to 93°.

22. An apparatus according to claim 16, wherein $B_{quench} \geq B_{feed}$.

23. An apparatus according to claim 16, wherein $B_{quench} = B_{feed} + \Delta B$, where ΔB is 4 mm.

24. An apparatus according to claim 16, wherein the feed-system for provision of a continuous gaseous feed flow comprises an evaporation chamber for evaporation of zinc metal, and the system for provision of at least one continuous supply flow of a cooling fluid comprises a supply line of nitrogen gas at room temperature and a pressure above the reactor chamber pressure in the range from $0.02 \cdot 10^5$ to $5 \cdot 10^5$ Pa.

25. An apparatus according to claim 16, wherein the feed-system for provision of a continuous gaseous feed flow comprises two or more evaporation chambers in fluid connection with the injection nozzle for the feed jet flow, and where the supply lines connecting the evaporation chambers are joined into one single gas conduit which are in fluid connection with the injection nozzle for the feed jet flow.

26. An apparatus according to claim 16, wherein $B_{quench} = B_{feed} + \Delta B$, where ΔB is 10 mm.

* * * * *